United States Patent
Pederson et al.

(10) Patent No.: US 8,555,206 B2
(45) Date of Patent: Oct. 8, 2013

(54) METHODS AND APPARATUS TO PRESENT RECIPE PROGRESS STATUS INFORMATION

(75) Inventors: Alan Richard Pederson, Austin, TX (US); Bryan Michael Jones, Cedar Park, TX (US); Dawn Marie Marruchella, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1140 days.

(21) Appl. No.: 11/963,492

(22) Filed: Dec. 21, 2007

(65) Prior Publication Data

US 2009/0164933 A1    Jun. 25, 2009

(51) Int. Cl.
*G06F 3/00* (2006.01)
*G06F 3/048* (2013.01)

(52) U.S. Cl.
USPC ............ 715/859; 715/748; 715/764

(58) Field of Classification Search
USPC ............ 715/764, 765, 771, 748, 859; 700/17, 700/19, 52, 73, 74
See application file for complete search history.

(56) References Cited

U.S. PATENT DOCUMENTS

| | | | |
|---|---|---|---|
| 4,500,687 A | 2/1985 | Wolfe | |
| 4,570,217 A | 2/1986 | Allen et al. | |
| 4,885,677 A | 12/1989 | Heilman et al. | |
| 5,058,043 A | 10/1991 | Skeirik | |
| 5,113,350 A | 5/1992 | Sargent | |
| 5,355,320 A | 10/1994 | Erjavic et al. | |
| 5,499,188 A | 3/1996 | Kline, Jr. et al. | |
| 5,576,946 A | 11/1996 | Bender et al. | |
| 5,631,825 A | 5/1997 | van Weele et al. | |
| 5,644,686 A | 7/1997 | Hekmatpour | |
| 5,689,415 A | 11/1997 | Calotychos et al. | |
| 5,696,885 A | 12/1997 | Hekmatpour | |
| 5,719,559 A | 2/1998 | Talbott et al. | |
| 5,720,007 A | 2/1998 | Hekmatpour | |
| 5,806,056 A | 9/1998 | Hekmatpour | |

(Continued)

FOREIGN PATENT DOCUMENTS

DE   10 2006 056143 A1   10/2007
EP   2 088 491 A1   8/2009

(Continued)

OTHER PUBLICATIONS

Eddy Santos, "Understanding S88 Batch Control" www.abjournel.com, Nov. 2001 (5 Pages).

(Continued)

*Primary Examiner* — Weilun Lo
*Assistant Examiner* — Truc Chuong
(74) *Attorney, Agent, or Firm* — Hanley, Flight and Zimmerman, LLC

(57) ABSTRACT

Example methods and apparatus to present recipe progress status information are disclosed. A disclosed example method involves displaying a user interface screen associated with a recipe being executed in a process control system. The recipe includes a plurality of process phases. A plurality of process stage progress indicator are displayed in the user interface screen in an arrangement representative of the process flow of the recipe. Each of the process stage progress indicators is representative of at least one of the process phases of the recipe. A first one of the process stage progress indicators is indicative of a progress of at least one of the process phases. The first process stage progress indicator is updated in substantially real-time based on information received from the process control system.

19 Claims, 11 Drawing Sheets

(56) References Cited

U.S. PATENT DOCUMENTS

| | | | |
|---|---|---|---|
| 5,822,745 A | 10/1998 | Hekmatpour | |
| 5,841,959 A | 11/1998 | Guiremand | |
| 5,870,768 A | 2/1999 | Hekmatpour | |
| 5,970,243 A | 10/1999 | Klein et al. | |
| 5,990,906 A | 11/1999 | Hudson et al. | |
| 6,000,830 A | 12/1999 | Asano et al. | |
| 6,173,418 B1 | 1/2001 | Fujino et al. | |
| 6,292,708 B1 | 9/2001 | Allen et al. | |
| 6,296,711 B1 | 10/2001 | Loan et al. | |
| 6,385,496 B1 | 5/2002 | Irwin et al. | |
| 6,385,552 B1 | 5/2002 | Snyder | |
| 6,415,246 B1 | 7/2002 | Snyder | |
| 6,438,436 B1 | 8/2002 | Hohkibara et al. | |
| 6,488,037 B1 | 12/2002 | Guldi | |
| 6,507,765 B1 | 1/2003 | Hopkins et al. | |
| 6,522,934 B1 | 2/2003 | Irwin et al. | |
| 6,535,122 B1 | 3/2003 | Bristol | |
| 6,542,841 B1 | 4/2003 | Snyder | |
| 6,571,191 B1 | 5/2003 | York et al. | |
| 6,606,527 B2 | 8/2003 | de Andrade et al. | |
| 6,615,091 B1 | 9/2003 | Birchenough et al. | |
| 6,647,301 B1 | 11/2003 | Sederlund et al. | |
| 6,684,117 B2 | 1/2004 | Bacin et al. | |
| 6,690,274 B1 | 2/2004 | Bristol | |
| 6,697,690 B2 | 2/2004 | Scholl et al. | |
| 6,791,692 B2 | 9/2004 | Powell et al. | |
| 6,834,370 B1 | 12/2004 | Brandl et al. | |
| 6,853,920 B2 | 2/2005 | Hsiung et al. | |
| 6,901,582 B1 | 5/2005 | Harrison | |
| 6,934,931 B2 | 8/2005 | Plumer et al. | |
| 6,947,917 B1 | 9/2005 | Mathur et al. | |
| 6,952,688 B1 | 10/2005 | Goldman et al. | |
| 6,952,808 B1 | 10/2005 | Jamieson et al. | |
| 6,976,033 B2 | 12/2005 | Yang et al. | |
| 6,983,229 B2 | 1/2006 | Brown | |
| 7,019,829 B2 | 3/2006 | Powell et al. | |
| 7,020,876 B1 | 3/2006 | Deitz et al. | |
| 7,069,101 B1 | 6/2006 | Arackaparambil et al. | |
| 7,092,771 B2 | 8/2006 | Retlich et al. | |
| 7,149,595 B2 | 12/2006 | D'Mura | |
| 7,171,281 B2 | 1/2007 | Weber et al. | |
| 7,179,664 B2 | 2/2007 | Huang et al. | |
| 7,202,946 B2 | 4/2007 | Powell et al. | |
| 7,310,798 B1 | 12/2007 | Gunara et al. | |
| 7,369,912 B2 | 5/2008 | Sherriff et al. | |
| 7,630,777 B2 | 12/2009 | Rudnick et al. | |
| 7,680,970 B2 | 3/2010 | Sherriff et al. | |
| 7,738,973 B2 * | 6/2010 | McGreevy et al. | 700/17 |
| 7,738,983 B2 | 6/2010 | Yamaji et al. | |
| 7,793,292 B2 | 9/2010 | Worek et al. | |
| 2002/0048213 A1 | 4/2002 | Wilmer et al. | |
| 2002/0055804 A1 | 5/2002 | Betawar et al. | |
| 2003/0090522 A1 | 5/2003 | Verhaar | |
| 2004/0128003 A1 | 7/2004 | Frampton et al. | |
| 2005/0015168 A1 | 1/2005 | Cho | |
| 2005/0052659 A1 | 3/2005 | Jacobsen et al. | |
| 2005/0177269 A1 | 8/2005 | Funk | |
| 2005/0228523 A1 | 10/2005 | Heminway et al. | |
| 2006/0020362 A1 | 1/2006 | Morinaga et al. | |
| 2006/0020931 A1 | 1/2006 | Clarke | |
| 2006/0074736 A1 | 4/2006 | Shukla et al. | |
| 2006/0089739 A1 | 4/2006 | Sherriff et al. | |
| 2006/0184264 A1 | 8/2006 | Willis et al. | |
| 2006/0191993 A1 | 8/2006 | Markham et al. | |
| 2007/0005170 A1 | 1/2007 | Schedel | |
| 2007/0006123 A1 | 1/2007 | Matsui | |
| 2007/0038889 A1 | 2/2007 | Wiggins et al. | |
| 2007/0050070 A1 * | 3/2007 | Strain et al. | 700/99 |
| 2007/0083282 A1 | 4/2007 | Lim | |
| 2007/0179652 A1 | 8/2007 | Weigang et al. | |
| 2007/0233302 A1 | 10/2007 | Miyazaki et al. | |
| 2008/0147207 A1 | 6/2008 | D'Mura et al. | |
| 2008/0172629 A1 * | 7/2008 | Tien et al. | 715/771 |
| 2009/0018692 A1 | 1/2009 | Yoneda | |
| 2009/0082894 A1 | 3/2009 | Pettus et al. | |
| 2009/0125126 A1 | 5/2009 | Moore, Jr. et al. | |
| 2009/0125906 A1 | 5/2009 | Moore, Jr. et al. | |

FOREIGN PATENT DOCUMENTS

| | | |
|---|---|---|
| GB | 2155662 | 9/1985 |
| GB | 2364399 | 1/2002 |
| GB | 2371610 | 7/2002 |
| GB | 2352060 | 11/2002 |
| GB | 2 454 785 | 5/2009 |
| JP | 8161670 | 6/1996 |
| JP | 200337032 | 2/2003 |
| JP | 2003132093 | 5/2003 |
| JP | 2003263221 | 9/2003 |
| JP | 2005309486 | 11/2005 |
| WO | 00/67086 | 11/2000 |
| WO | 2006/114595 | 11/2006 |
| WO | 2007/017738 | 2/2007 |
| WO | 2007/086027 | 8/2007 |
| WO | 2007/086458 | 8/2007 |

OTHER PUBLICATIONS

Emerson Process Management, "DeltaV Operate" Emerson Process Management Product Data Sheet, Dec. 2006 (9 Pages).

Steve Rubel, "Paying Attention to Attention," Mar. 28, 2006, [retrieved from http://http://www.micropersuasion.com/2006/03/paying_attentio.html, accessed on Feb. 11, 2009], 2 pages.

"The Touchstone Manifesto," Touchstone—Are you Paying Attention, [retrieved from http://web.archive.org/web/20060615001506/www.touchstonegadget.com/manifesto/, accessed on Feb. 11, 2009], 2 pages.

The European Patent Office, "Partial European Search Report," European application No. EP 08022202.9, Dec. 1, 2010, 5 pages.

Olsson, Rasmus, "Batch Control and Diagnosis," Department of Automatic Control, Lund Institute of Technology, Jun. 2005, 248 pages.

Deitz, Lorenzo, Stephan. "S88 Redefines Clean in Place." Jun. 2005. www.pharmamanufacturing.com.

Romero, Espuna, Friedler, Puigjaner. "A New Framework for Batch Process Optimization Using the Flexible Recipe." Industrial & Engineering Chemistry Research. vol. 42, pp. 370-379. 2003.

Stallman et al., "Debugging with the GNU Source-Level Debugger," Jan. 1994, Edition 4.12, pp. 1-15.

"Fisher-Rosemount System Expands the DeltaV System to 30,000 Points with Release 5," Emerson Process Management-News, Jul. 10, 2000 [Retrieved via the Internet from http://www.plantautomation.com/article.mvc/Fisher-Rosemount-Expands-DeltaV-System-to-300-0001 on Jun. 3, 2011].

Emerson Process Management, "DeltaV Batch Active Step Change," pp. 1-22, May 2004.

The European Patent Office, "Extended European Search Report," European application No. EP 08022202.9, Mar. 25, 2011, 9 pages.

State Intellectual Property Office of P.R. China, "First Office Action," Chinese application No. 200810186503.7, issued on Mar. 20, 2012, 12 pages.

Intellectual Property Office, "Examination Report," Great Britain application No. GB0823050.0, issued on Feb. 29, 2012, 3 pages.

Japan Patent Office, "Notice of Reasons for Rejection," Japanese application No. 2008-320921, issued on Jan. 15, 2013, 2 pages.

Intellectual Property Office, "Combined Search and Examination Report," Great Britain application No. 1301327.1, issued on Feb. 19, 2013, 5 pages.

State Intellectual Property Office of P.R. China, "Second Office Action," Chinese application No. 200810186503.7, issued on Jun. 28, 2012, 5 pages.

State Intellectual Property Office of P.R. China, "Decision of Rejection," in Chinese Patent Application No. 200810186503.7, issued on Feb. 18, 2013 (3 pages).

* cited by examiner

METHODS AND APPARATUS TO PRESENT RECIPE PROGRESS STATUS INFORMATION

FIELD OF THE DISCLOSURE

The present disclosure relates generally to process control systems and, more particularly, to methods and apparatus to present recipe progress status information.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controllers receive signals indicative of process measurements made by the field devices and/or other information pertaining to the field devices, use this information to implement a control routine, and then generate control signals that are sent over the buses or other communication lines to the field devices to control the operation of the process. In this manner, the process controllers may execute and coordinate control strategies using the field devices via the buses and/or other communication links communicatively coupling the field devices.

Process control systems are often configured to perform processes in accordance with recipes to produce products. Product designers or engineers prepare recipes during a design time and store the recipes to be subsequently used a plurality of times by a process control system. A recipe typically includes a combination of unit procedures, operations, and phases, all of which include instructions to control process equipment (e.g., tanks, vats, mixers, boilers, evaporators, pumps, valves, etc.) to transfer, mix, etc. ingredients in a process control system to generate a product.

To display recipes, some known systems use a procedural function chart (PFC) including blocks for each process step or phase of the recipe. During execution of the recipe, the PFC shows which process step or phase is currently being executed so that an operator or other user can see which part of the recipe is being executed. This type of status information of those known systems is very high level, general information that merely informs a user of a step or phase in a recipe that is currently being executed without any other information specific to that step or phase such as, for example, pressure measurements, temperature measurements, progress (e.g., percent complete) of that particular phase, etc. In some known systems, such phase characteristics can be viewed via a terminal by navigating away from the PFC to display phase characteristics corresponding to particular process steps or equipment selected by a user. In other known systems, a user must visually inspect the physical equipment used to implement the recipe to determine phase characteristics of a particular step or phase by, for example, reading gauges. The disconnection between the PFC display of a recipe and the phase characteristics of process steps or phases in the above-described known systems requires that a user leave or navigate away from a PFC display of a recipe to observe phase characteristics corresponding to the status of the recipe execution, thereby burdening users with having to remember, organize, and coordinate all of this information when navigating between different screen views.

SUMMARY

Example apparatus and methods to present recipe progress status information are described. In accordance with a described example, an example method involves displaying a user interface screen associated with a recipe being executed in a process control system. The recipe includes a plurality of process phases. In addition, the example method involves displaying a plurality of process stage progress indicators in the user interface screen in an arrangement representative of the process flow of the recipe. Each of the process stage progress indicators is representative of at least one of the process phases of the recipe, and each of the process stage progress indicators is indicative of a progress of at least one respective one of the process phases. The example method also involves updating a first one of the process stage progress indicators in substantially real-time based on information received from the process control system.

In accordance with another described example, an example apparatus includes a screen selector, a user interface manager, and a data processor. The screen selector is to select a user interface screen to display in association with a recipe being executed in a process control system. The recipe includes a plurality of process phases. The user interface manager is to display a plurality of process stage progress indicators in the user interface screen in an arrangement representative of the process flow of the recipe. Each of the process stage progress indicators is representative of at least one of the process phases of the recipe, and each of the process stage progress indicators is indicative of a progress of at least one respective one of the process phases. The data processor is to generate updated progress information for a first one of the process stage progress indicators in substantially real-time based on information received from the process control system.

In accordance with yet another described example, another example method involves displaying a screen associated with a recipe including a plurality of process phases. In addition, the example method involves partitioning the screen into bounded display areas. The bounded display areas include a plurality of summary information display areas and a detailed information display area. The example method also involves generating a plurality of summary capsules. Each of the summary capsules corresponds to at least one of the process phases of the recipe. Also, the example method involves displaying each of the summary capsules in a respective one of the summary information display areas in an arrangement indicative of a process flow of the recipe. In addition, detailed information corresponding to at least one of the process phases of the recipe is displayed in the detailed information display area.

In accordance with another described example, another example apparatus includes a screen selector, a summary information generator, a user interface manager, and a detailed information generator. The screen selector is to select a screen to display in association with a recipe including a plurality of process phases. The screen is partitioned into bounded display areas, and the bounded display areas include a plurality of summary information display areas and a detailed information display area. The summary information generator is to generate a plurality of summary capsules, each corresponding to at least one of the process phases of the recipe. The user interface manager is to display each of the summary capsules in a respective one of the summary information display areas in an arrangement indicative of a process flow of the recipe. The detailed information generator is to generate detailed information corresponding to at least one of the process phases of the recipe for display in the detailed information display area.

In accordance with yet another described example, another example method involves displaying a screen associated with first and second recipes being executed in at least one process control system. In addition, the example method involves displaying a first plurality of process stage progress indicators in the screen in an arrangement representative of a first process flow of the first recipe and a second plurality of process stage progress indicators in the screen in an arrangement representative of a second process flow of the second recipe. Each of the first process stage progress indicators represents at least one of a first plurality of process phases of the first recipe, and each of the second process stage progress indicators represents at least one of a second plurality of process phases of the second recipe. The example method also involves displaying a first progress fill element in association with one of the first process stage progress indicators and a second progress fill element in association with one of the second process stage progress indicators. The first progress fill element indicates a progress of one of the first process phases of the first recipe corresponding to the one of the first process stage progress indicators, and the second progress fill element indicates a progress of one of the second process phases of the second recipe corresponding to the one of the second process stage progress indicators.

In accordance with another described example, another example apparatus includes a screen selector, a user interface manager, and a data processor. The screen selector is to select a screen to display in association with first and second recipes being executed in at least one process control system. The user interface manager is to display a first plurality of process stage progress indicators in the screen in an arrangement representative of a first process flow of the first recipe and a second plurality of process stage progress indicators in the screen in an arrangement representative of a second process flow of the second recipe. Each of the first process stage progress indicators represents at least one of a first plurality of process phases of the first recipe, and each of the second process stage progress indicators represents at least one of a second plurality of process phases of the second recipe. The data processor is to generate first progress information corresponding to a first progress fill element displayed in association with one of the first process stage progress indicators and second progress information corresponding to a second progress fill element displayed in association with one of the second process stage progress indicators. The first progress information indicates a progress of one of the first process phases of the first recipe corresponding to the one of the first process stage progress indicators, and the second progress information indicates a progress of one of the second process phases of the second recipe corresponding to the one of the second process stage progress indicators.

DETAILED DESCRIPTION

Although the following describes example methods, apparatus, and systems including, among other components, software and/or firmware executed on hardware, it should be noted that these examples are merely illustrative and should not be considered as limiting. For example, it is contemplated that any or all of the hardware, software, and firmware components could be embodied exclusively in hardware, exclusively in software, or in any combination of hardware and software. Accordingly, while the following describes example methods, apparatus, and systems, persons of ordinary skill in the art will readily appreciate that the examples provided are not the only way to implement such methods, apparatus, and systems.

The methods, apparatus, and systems described herein can be used to display progress and status information of recipes executed by process control systems. While executing a recipe, an operator or other user may wish to check the status of recipe progress. Unlike traditional systems that require users to leave or navigate away from procedural function chart (PFC) displays of recipes to observe phase characteristics corresponding to the status of recipe executions, thereby burdening users with having to remember, organize, and coordinate all of this information when navigating between different screen views, the example methods, apparatus, and systems described herein can be used to display relatively more recipe progress and status information on a single GUI screen. Thus, the examples described herein facilitate user observation of relatively more status information without requiring a user to navigate between different GUI screens of a recipe execution and/or monitoring application. For example, while some known PFC displays may be used to present a high level flow diagram of a recipe, when a user wishes to observe more detailed information of particular phases in the recipe, the user must navigate away from the PFC display to other GUI screens, each corresponding to the particular detailed information (e.g., pressure information, temperature information, time to phase completion information, ingredients information, etc.) sought to be observed. Using the example methods, apparatus, and systems described herein, example recipe progress GUI screens may be configured to display relatively more detailed information of each phase of a recipe in connection with displaying the general, overall flow of a recipe. In this manner, a user can observe the general flow of a recipe while simultaneously viewing more detailed information pertaining to each phase in the recipe that would otherwise only be viewable in many known systems by navigating away from a PFC screen to other process detail screens.

Figure 1:
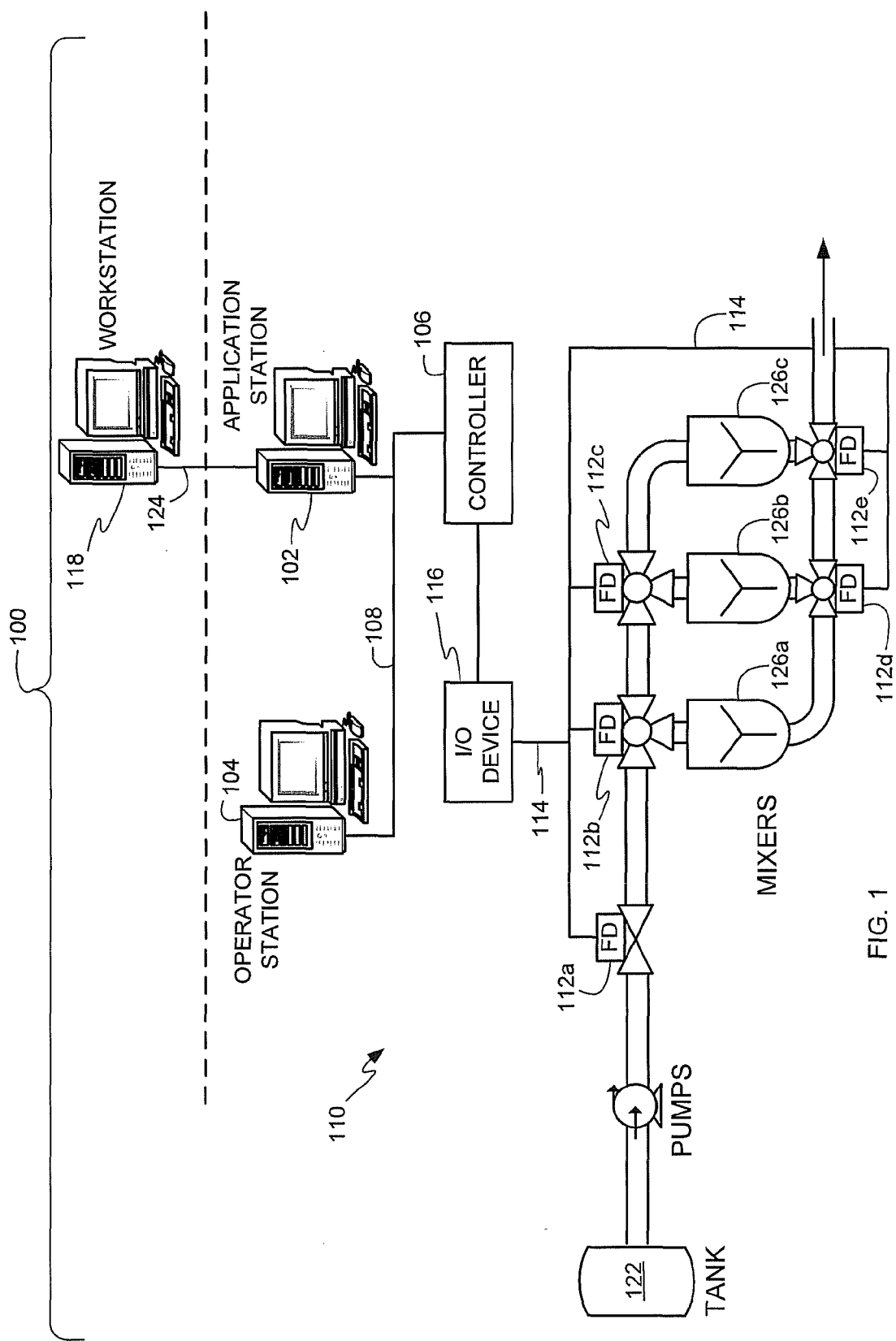
FIG. 1 is a block diagram illustrating an example enterprise in which the example methods and apparatus described herein may be implemented.

Now turning to FIG. 1, an example enterprise 100 in which the example methods and apparatus described herein may be implemented includes a process control system 110 having an application station 102, an operator station 104, and a controller 106, all of which may be communicatively coupled via a bus or local area network (LAN) 108. The LAN 108 is commonly referred to as an application control network (ACN) and may be implemented using any desired wired or wireless communication medium and protocol. Although one process control system is illustrated, the example enterprise 100 may include any number of distributed process control systems.

The application station 102 may be configured to perform operations associated with one or more software applications such as, for example, process control-related applications and communication applications that enable the application station 102, the operator station 104, and/or the controller 106 to communicate with other devices or systems. The application station 102 may also be configured to execute batch recipes to control the operations of the process control system 110 and/or any other process control system needed to execute the batch recipes. For example, the application station 102 can be provided with a batch recipe processor or application (not shown) that can acquire any necessary controllers (e.g., the controller 106) and/or any other resources (e.g., process equipment, field devices, instrumentation, etc.) to execute recipes. In addition, the application station 102 can perform operations associated with one or more application(s) used to implement the example methods and apparatus described herein to show the status of batch recipes being executed in one or more process control systems of the example enterprise 100. In some example implementations, the application station 102 and the operator station 104 may be configured to perform the same functions, while in other example implementations the operator station 104 may be primarily configured to display process progress and status information and allow minimal, restricted user interaction with the process. The application station 102 and the operator station 104 may be implemented using one or more workstations or any other suitable computer systems or processing systems (e.g., the processor system 510 of FIG. 5) including, for example, single processor personal computers, single or multi-processor workstations, etc.

The controller 106 may be coupled to a plurality of field devices 112 via a digital data bus 114 and an input/output (I/O) device 116. The field devices 112 may be Fieldbus compliant valves, actuators, sensors, etc. Of course, other types of field devices and communication protocols (e.g., Profibus devices and protocol, HART devices and protocol, etc.) could be used instead. Additional I/O devices (similar or identical to the I/O device 116) may be coupled to the controller 106 to enable additional groups of field devices, which may be Fieldbus devices, HART devices, etc., to communicate with the controller 106.

The controller 106 may be, for example, a DeltaV™ controller sold by Emerson Process Management. However, any other controller could be used instead. Further, while only one controller is shown in FIG. 1, additional controllers of any desired type or combination of types could be coupled to the LAN 108. In any case, the controller 106 may perform one or more process control routines that have been generated by a system engineer or other system operator using the application station 102, the operator station 104, or any workstation and which have been downloaded to and instantiated in the controller 106.

The enterprise 100 also includes a workstation 118 that is communicatively coupled to the application station 102 via another LAN 124 and to the operator station 104 and the controller 106 via the application station 102. The workstation 118 may be geographically remotely located, in which case the workstation 118 may be communicatively coupled to the LAN 124 via a wide area network (WAN) that is implemented using, for example, a wireless communication link, an Internet-based or other switched packet-based communication network, telephone lines (e.g., digital subscriber lines), or any combination thereof. The workstation 118 may be configured to perform enterprise-level or plant-wide functions. The workstation 118 may be associated with another process control system network (not shown) and configured to perform primarily process control functions, one or more communication functions, etc. For example, the workstation 118 may be configured to show the progress and status of batch recipes being executed in one or more other process control systems of the example enterprise 100 not shown in FIG. 1 including remotely located process control systems.

In the illustrated example, each of the field devices 112 is coupled to process equipment to control the flow of fluid or material to be processed. In particular, each of the field devices 112a-e is coupled to a respective valve to control flow from a tank 122 to mixers 126a-c and from the mixers 126a-c to another process phase. The controller 106 is provided with a recipe or a portion of a recipe. A recipe can define a procedure to prepare a particular product (e.g., a paint, a fuel, a pharmaceutical, etc.) and includes, one or more unit procedures, which include one or more operations, each of which includes one or more phases (i.e., process steps). In the illustrated example of FIG. 1, a procedure can define multiple unit procedures to prepare a paint of a particular color. Each unit procedure can define a different mixing phase. For example, a first unit procedure can define a pre-mix procedure used to mix base ingredients (e.g., latex, oil, solvent, etc.), a second unit procedure may be used to mix intermediary ingredients (e.g., a binder, a surfactant, etc.), and another unit procedure may be used to mix colored pigments into the product.

Each unit procedure is implemented using one or more operations, each having one or more process phases or process steps. A process phase can correspond to particular process equipment (e.g., one of the mixers 126a-c). In the illustrated example of FIG. 1, executing an operation may involve using an ingredient addition phase corresponding to the tank 122 and a mixing or agitation phase corresponding to the mixer 126a. The addition phase may involve adding an ingredient from the tank 122 to another ingredient already in the mixer 126a and controlling the mixer 126a to mix the ingredients. After the mixer 126a is finished mixing the ingredients, the field devices 112d-e can be controlled to allow the mixture to flow from the mixer 126a to another phase, which may be part of the same or another operation.

Executing any particular phase may involve the use of process control equipment (e.g., the tank 122, one or more of the mixers 126a-c, etc.) and one or more field devices that acquire progress and status information for that phase including measurement values or progress-related parameter values. Example measurement values may include temperature values, pressure values, pH-level values, ingredient concentration values, etc., and example progress-related values may include an amount of material delivered, fill levels, time to phase completion, ingredients mixed, ingredients remaining to be mixed, etc. To enable users to observe progress and status information for each phase of a recipe while contemporaneously viewing the overall flow of the recipe, the example methods, apparatus, and systems described herein can be used to generate recipe progress and status screen views that can be displayed by the application station 102, the operator station 104, and/or the workstation 118. In this manner, users can relatively quickly and easily determine how the progress and status of a particular phase affects (or may be affected) by the overall flow a respective recipe without having to navigate between different screen views as is required by many known process control system applications.

Figure 2:
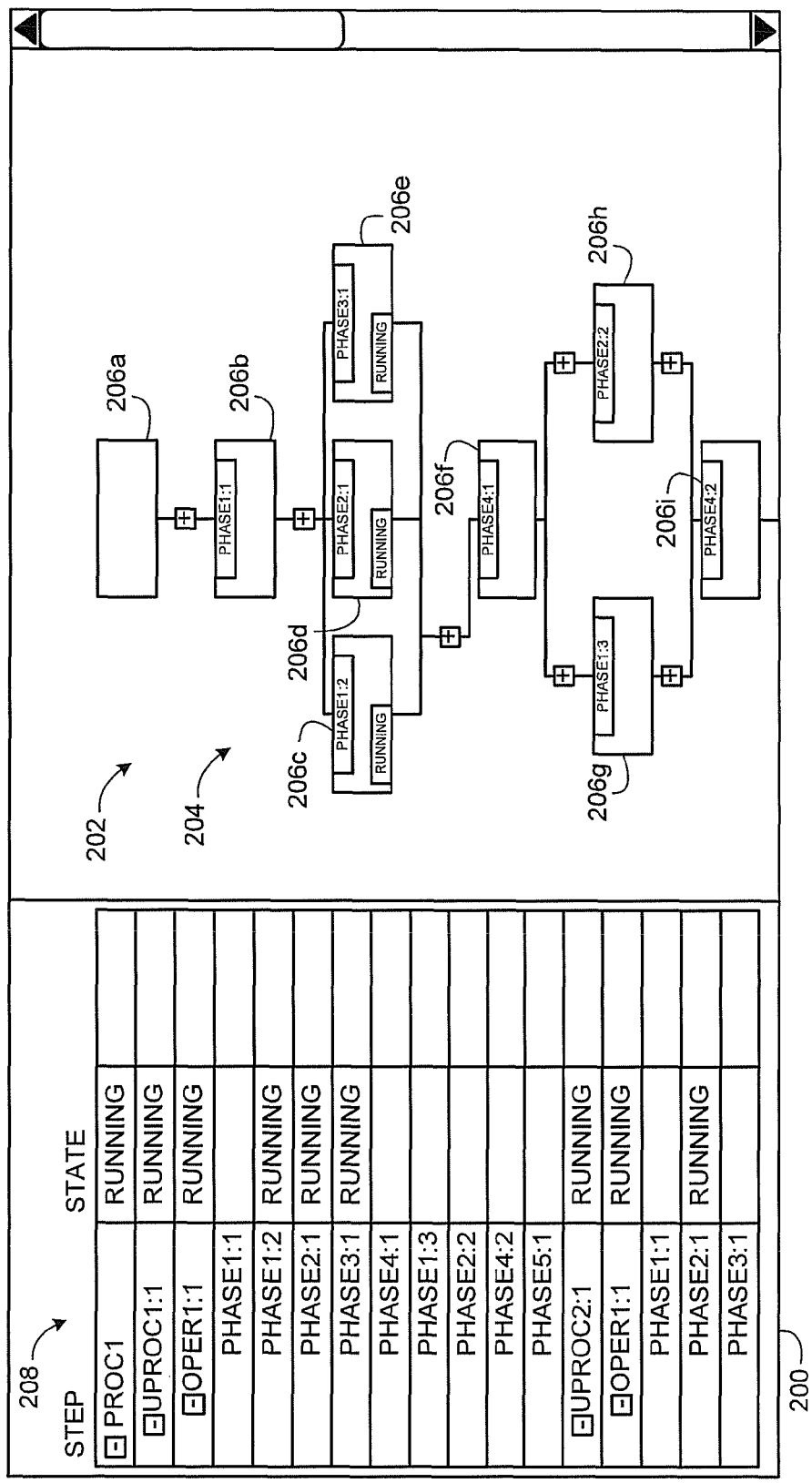
FIG. 2 is a known graphical user interface (GUI) of an example procedural function chart (PFC) view interface traditionally used to display the progress status of a recipe.

FIG. 2 is a graphical user interface (GUI) of an example known procedural function chart (PFC) view interface 200. Such known PFC view interfaces like the PFC view interface 200 can be displayed by application stations, operations stations, or workstations (e.g., the application station 102, the operator station 104, and/or the workstation 118 of FIG. 1) to show the overall process flow of a recipe. User interfaces such as the PFC view interface 200 are often used in connection with S-88 ANSI/ISA-S88.01-1995 Batch Standard recipes. In the illustrated example, the PFC view interface 200 includes a procedural function chart (PFC) 202 of an example batch recipe 204. The example batch recipe 204 having process steps or process phases 206a-i to be executed in accordance with the shown process flow.

As used herein, a process phase (e.g., each of the process phases 206a-i) refers to a respective equipment process phase that corresponds to particular process control system equipment, and one or more process phases is referred to as a process stage. For example, referring briefly to FIG. 10, another procedural function chart (PFC) view interface 1000 shows a batch recipe 1004 having a plurality of process phases 1006a-i. In the illustrated example of FIG. 10, the process phase 1006b may be implemented using a first tank that fills a mixer with a first ingredient, the process phase 1006c may be implemented using a second tank that fills the mixer with a second ingredient, the process phase 1006d may be implemented using a third tank to fill the mixer with a third ingredient, and the process phase 1006e may be implemented using a third tank to fill the mixer with a fourth ingredient. In the illustrated example of FIG. 10, the process phases 1006b-e form a process stage 1008, which is designated as an ingredients fill process stage. Another process stage may include the process phase 1006f alone to form, for example, a mixing process stage.

Returning to FIG. 2, to show the state of each of the process phases 206a-i, the PFC view interface 200 is provided with a phase state table 208, which lists each of the process phases 206a-i in association with their respective operating states to indicate when they are running. Although the PFC view interface 200 shows a general overview of the process flow of the batch recipe 204 and when each of the process phases 206a-i is running, the PFC view interface 200 does not show any more specific data (e.g., pressure values, temperature values, progress indicators, etc.) for each of the process phases 206a-i. Unlike many known PFC view interfaces such as the PFC view interface 200 of FIG. 2, the example methods, apparatus, and systems described herein can be used to enable a user to observe specific information about each process phase or each process stage (e.g., a single or a group or plurality of process phases) of a recipe while simultaneously being able to observe the overall process flow and/or the overall process progress of a recipe.

Figure 3:
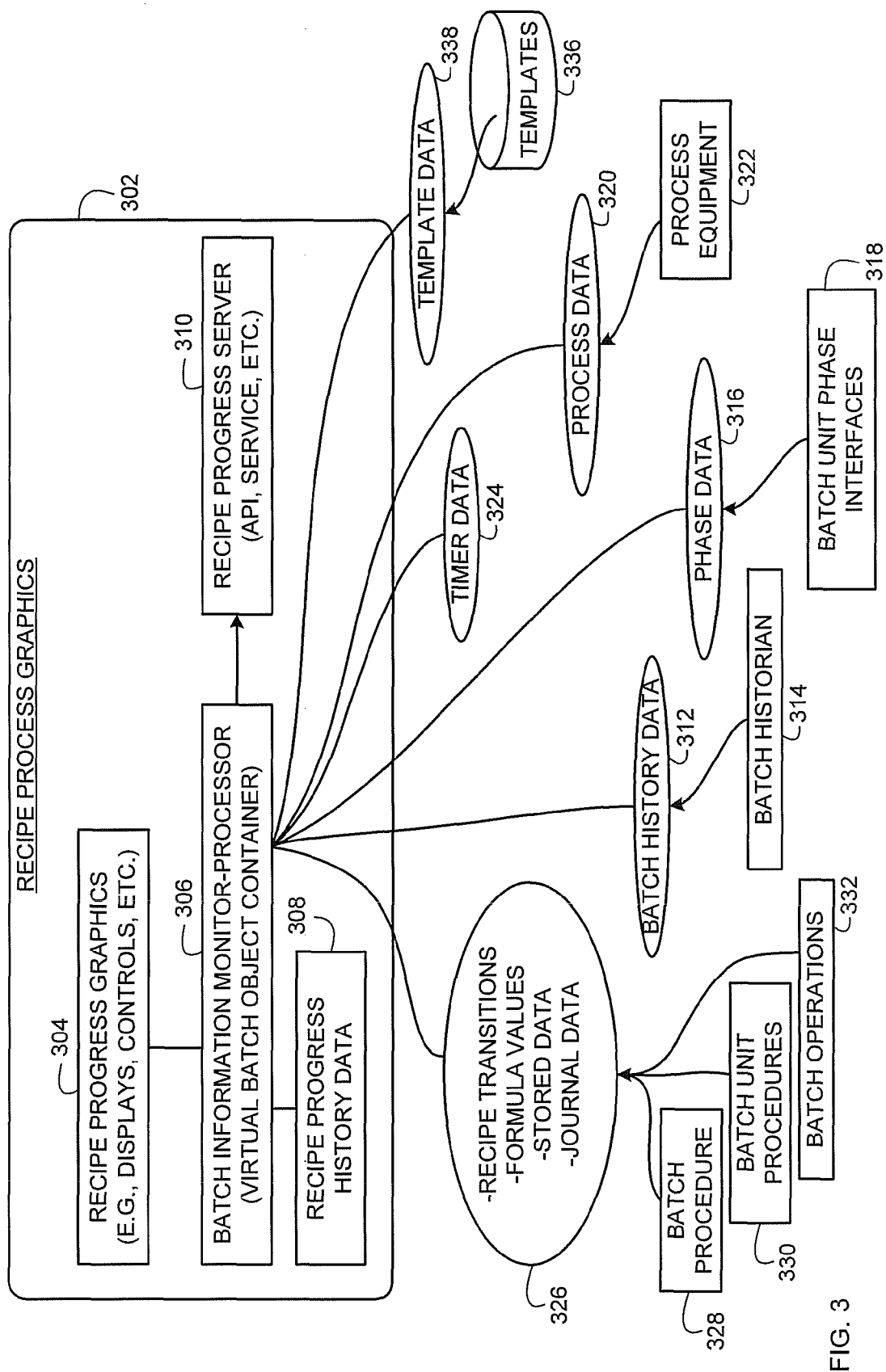
FIG. 3 is a block diagram of an example recipe process graphics system that may be used to generate GUI screens to display process flow, progress, and status information of recipes.

FIG. 3 is a block diagram of an example recipe process graphics system 302 that may be used to generate GUI screens to represent process flow, progress, and status information of recipes. For example, the GUI screens can include high-level information about overall process flows and/or overall progress and status of recipes (e.g., the recipe 204 of FIG. 2) and phase-specific information about parameters pertinent to each process phase (e.g., the process phases 206a-i of FIG. 2) or each process stage of the recipes. The example recipe progress graphics system 302 may be implemented using any desired combination of hardware, firmware, and/or software. For example, one or more integrated circuits, discrete semiconductor components, or passive electronic components may be used. Additionally or alternatively, some or all of the blocks of the example recipe process graphics system 302, or parts thereof, may be implemented using instructions, code, and/or other software and/or firmware, etc. stored on a machine accessible medium that, when executed by, for example, a processor system (e.g., the processor system 910 of FIG. 9) perform the operations represented in the flow diagram of FIGS. 8A and 8B. Although the example recipe process graphics system 302 is described as having one of each block described below, the example system 302 may be provided with two or more of any block described below. In addition, some blocks may be disabled, omitted, and/or combined with other blocks.

In the illustrated example, the example recipe process graphics system 302 includes a recipe progress graphics repository 304, a batch information processor 306, a recipe progress history data store 308, and a recipe progress server 310. The recipe progress graphics repository 304 is provided to store graphical elements including graphical objects and/or graphical representations used to represent different aspects, characteristics, parameters, criteria, associated with the progress and/or status of recipes. In addition to storing graphical representations or graphical elements used to display the progress and/or status of recipes, the recipe progress graphics repository 304 also stores definitions and/or methods used to control the display characteristics (e.g., animations, color coding, pattern fill coding, active/inactive views, etc.) of the graphical representations. Also, the recipe progress graphics repository 304 is used to store graphical elements or representations of user interface controls that may be displayed in association with progress and/or status screens and definitions and/or methods to control display of the same.

In some example implementations, the recipe progress graphics repository 304 may also be used to store screen templates that can be used to generate progress/status user interface screens for display. The screen templates can include data place holders that can be assigned to different data sources so that each screen template can be used to display progress and/or status information for a different recipe, different process phases, and/or different process stages. For example, if a user prefers a particular screen template layout, the user can elect to use that screen template for viewing progress and/or status information for any recipe even if different recipes include different types of process phases (e.g., the process phases 206a-i of FIG. 2) and/or are configured to perform completely different processes to produce different products.

To collect, monitor, and/or process progress information, status information, and/or any other information associated with the execution of batch recipes, the recipe process graphics system 302 is provided with the batch information monitor-processor 306. For example, the batch information monitor-processor 306 may collect and process recipe flow/structure information, historical data, user input data, equipment configuration data, etc. In the illustrated example, the batch information monitor-processor 306 can be implemented as a virtual object container that receives batch recipe progress and/or status information from one or more different process control systems (e.g., process control systems of the enterprise 100 of FIG. 1). The batch information monitor-processor 306 can include or be coupled to a temporary cache memory for temporarily storing the information for analyzing, processing, and/or for use in displaying graphical indicators (e.g., graphical objects or representations stored in the recipe progress graphics repository 304) indicative of the process and/or status of respective recipes being executed.

The batch information monitor-processor 306 can analyze and/or process received information using different algorithms and/or processing techniques. For instance, the batch information monitor-processor 306 may be provided with threshold values or other configuration settings to define when parameter values trigger certain changes in how status and/or progress information is to be depicted via the graphical objects and/or representations stored in the recipe progress graphics repository 304. For example, the batch information monitor-processor 306 may be provided with several threshold values for pressure measurement values corresponding to particular process steps in a recipe, and each of the threshold values can correspond to a different safety status level. When pressure levels reach different respective threshold values, the batch information monitor-processor 306 can control how the graphical objects from the recipe progress graphics repository 304 are displayed on a screen to reflect the different safety status levels for each of the threshold values.

The batch information monitor-processor 306 may be provided with different statistical processing functions or other mathematical processing functions to process status and/or progress information received from a process control system and store results in cache memory. In this manner, the processed data can be used to display status and/or progress information via different recipe progress and status display screens using the graphical elements provided by the recipe progress graphics repository 304. Example data that can be collected, processed, and/or generated by the batch information monitor-processor 306 includes duration or estimated duration of executing a batch recipe, quality assessment, time to completion for an overall batch recipe, identification of currently executing process phases (e.g., the process phases 206*a-i* of FIG. 2) or process stages, percentage of completeness for each currently executing phase or stage, expected duration of each phase or stage, expected completion time for each phase or stage, real-time process variable measurement data, expected values for process variable data, setpoint values, etc. The example methods, apparatus and systems described herein for displaying recipe process graphics to show process and/or status of recipes can display this data and/or any other types of data to facilitate understanding, analyses, and decision making by operators, engineers, and managers of batch plants.

To store historical process data that can be used by the batch information monitor-processor 306 to analyze and process current process data and/or to display historical statistical information about recipes, the recipe process graphics system 302 is provided with the recipe progress history data store 308 (e.g., a memory, a database, etc.). For example, the batch information monitor-processor 306 can store batch recipe progress and/or status information for a currently executing recipe that may be useful in analyzing the progress and/or status of the batch recipe during subsequent executions. For example, it may be of interest for operators to see how particular process phases (e.g., one of the process phases 206*a-i* of FIG. 2) or process stages are progressing or performing relative to previous executions of those process phases or process stages. To display such relative progress or performance comparisons, the batch information monitor-processor 306 may retrieve progress, status, and/or other performance information previously stored in the recipe progress history data store 308 for previous executions of those process phases or stages, and analyze progress, status, and/or other performance information of current executions of the phases or stages based on the retrieved historical progress, status, and performance information. In addition, the batch information monitor-processor 306 can retrieve history data from a batch historian of the enterprise 100 (FIG. 1) to use in connection with analyzing a currently executing batch recipe and store the batch history data in the recipe progress history data store 308 for relatively quicker retrieval.

To serve application program interfaces (API's), graphic display services, graphical user interface services, etc. to display recipe process graphics generated by the recipe process graphics system 302, the recipe process graphics system 302 is provided with the recipe progress server 310. The recipe progress server 310 can be made available to network entities (e.g., the application station 102, the operator station 104, the workstation 118 of FIG. 1) in the enterprise 100 to display batch recipe progress, status, and/or performance information.

As shown in the illustrated example of FIG. 3, to collect, analyze, and process information associated with batch recipes executed by one or more process control systems of the example enterprise 100 of FIG. 1, the recipe process graphics system 302 can retrieve data from various data sources in a process control system or enterprise. For example, the batch information monitor-processor 306 can retrieve batch history data 312 from a batch historian 314, phase data 316 from batch unit phase interfaces 318 (e.g., controllers, field devices, etc.), and process data 320 from process equipment 322 (e.g., field devices or other sensors, actuators, etc. coupled to process equipment (e.g., the tank 122, the mixers 126*a-c*, etc. of FIG. 1)). The batch information monitor-processor 306 can also retrieve timer data 324 from different sources (e.g., timers, counters, clocks, etc.) in the example enterprise 100 indicative of start times, end times, progress/duration times, etc. corresponding to currently executing batch recipes and/or process phases. In addition, the batch information monitor-processor 306 can retrieve recipe transitions, formula values, stored data, and journal data 326 from a batch procedure 328, batch unit procedures 330, and batch operations 332.

The example methods, apparatus, and systems described herein can be used to enable users (e.g., operators, engineers, etc.) to create and store customized templates of progress/status displays. In this manner, a user may define a progress/status user interface screen to display the type of information that the user is interested in viewing for a selected batch recipe. Users can define user interface screens as aesthetically appealing and/or as informative as desired. In the illustrated example of FIG. 3, a templates database 336 is provided to store template data 338 and enable the batch information monitor-processor 306 to retrieve the stored templates (e.g., user-created screen templates) when users request to view particular screens corresponding to those templates.

Figure 4:
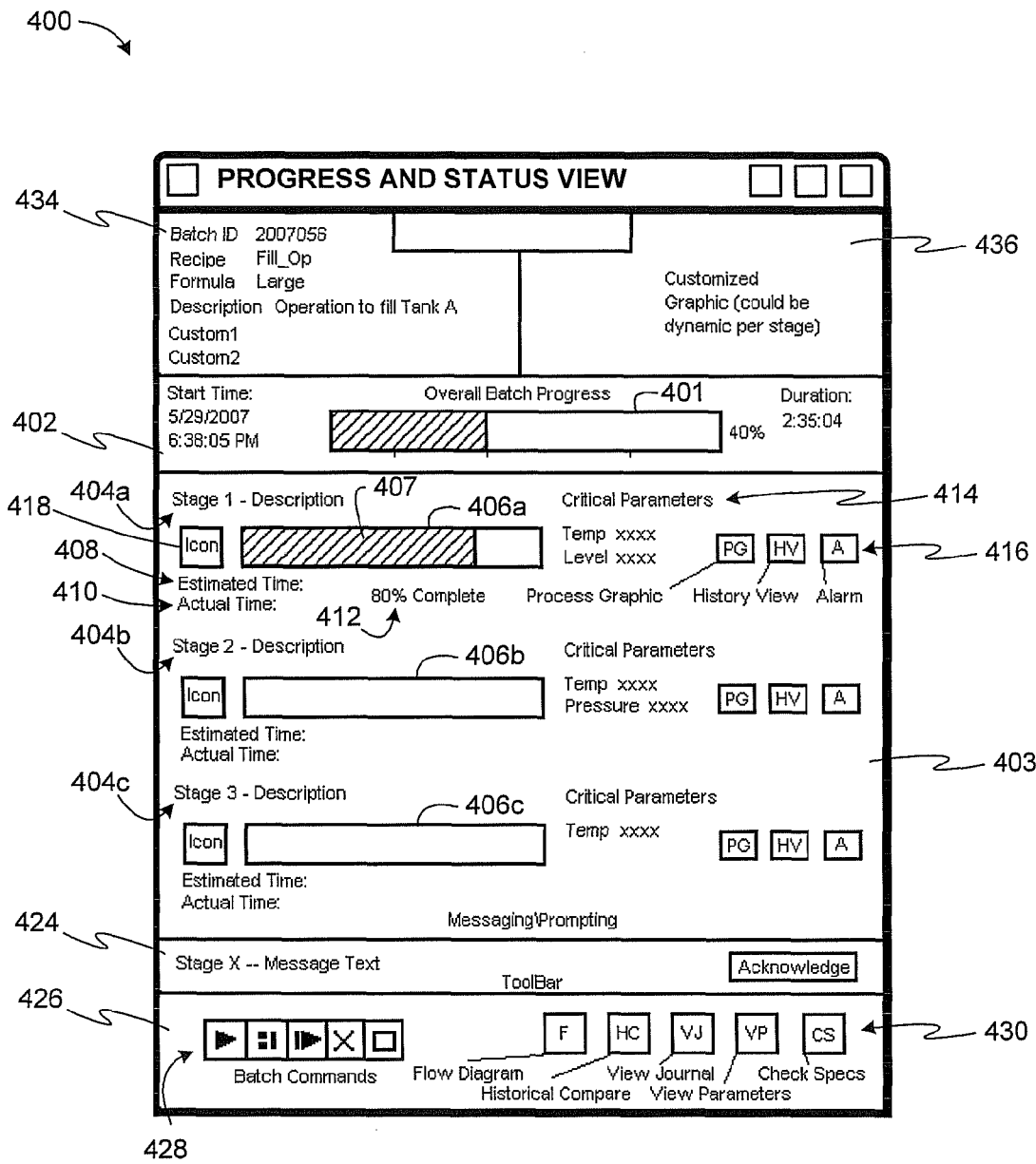
FIGS. 4-6 illustrate example GUI screens that may be implemented to represent the process flow, progress, and status information of example recipes using the example methods, apparatus, and systems described herein.
Figure 5:
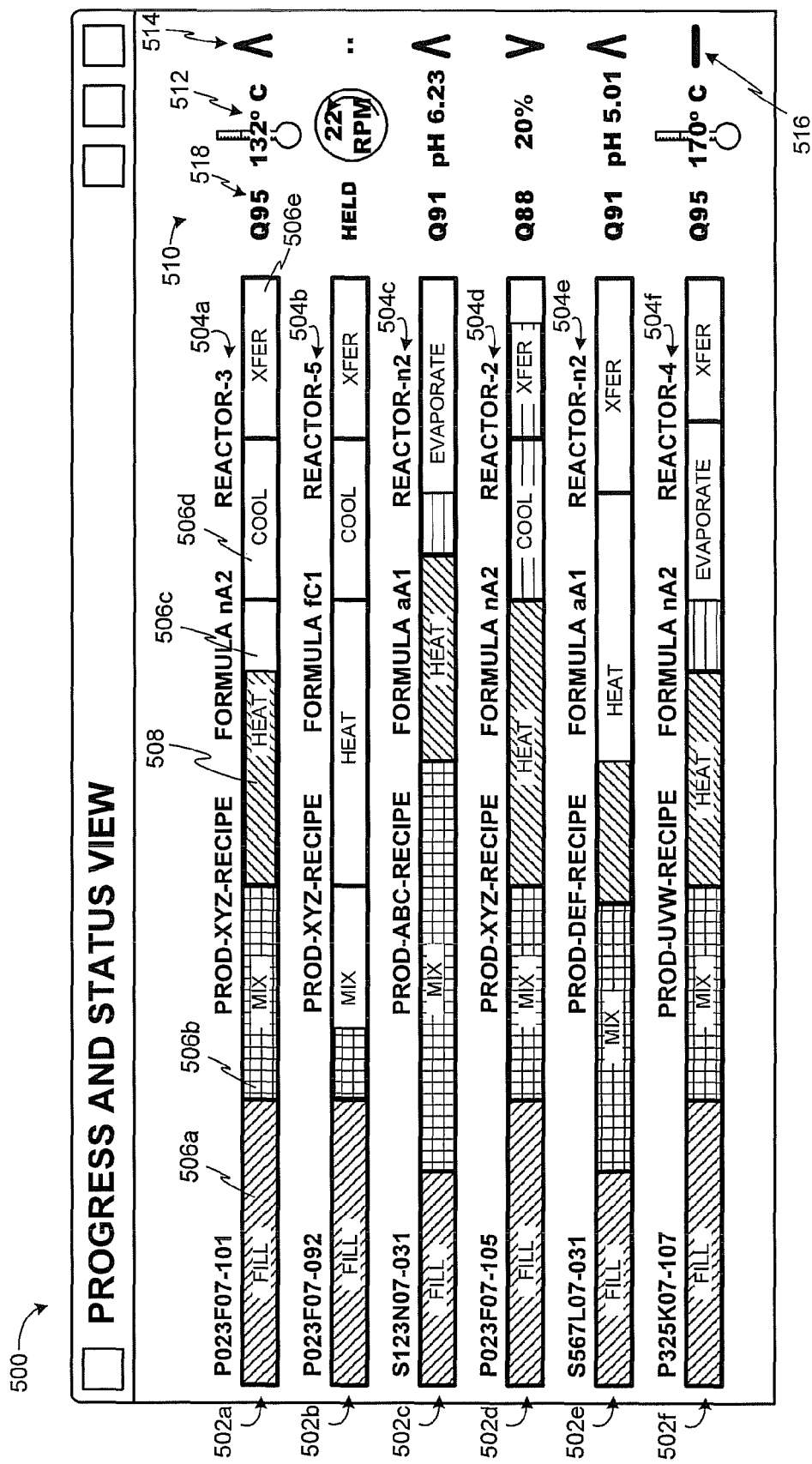
Figure 6:
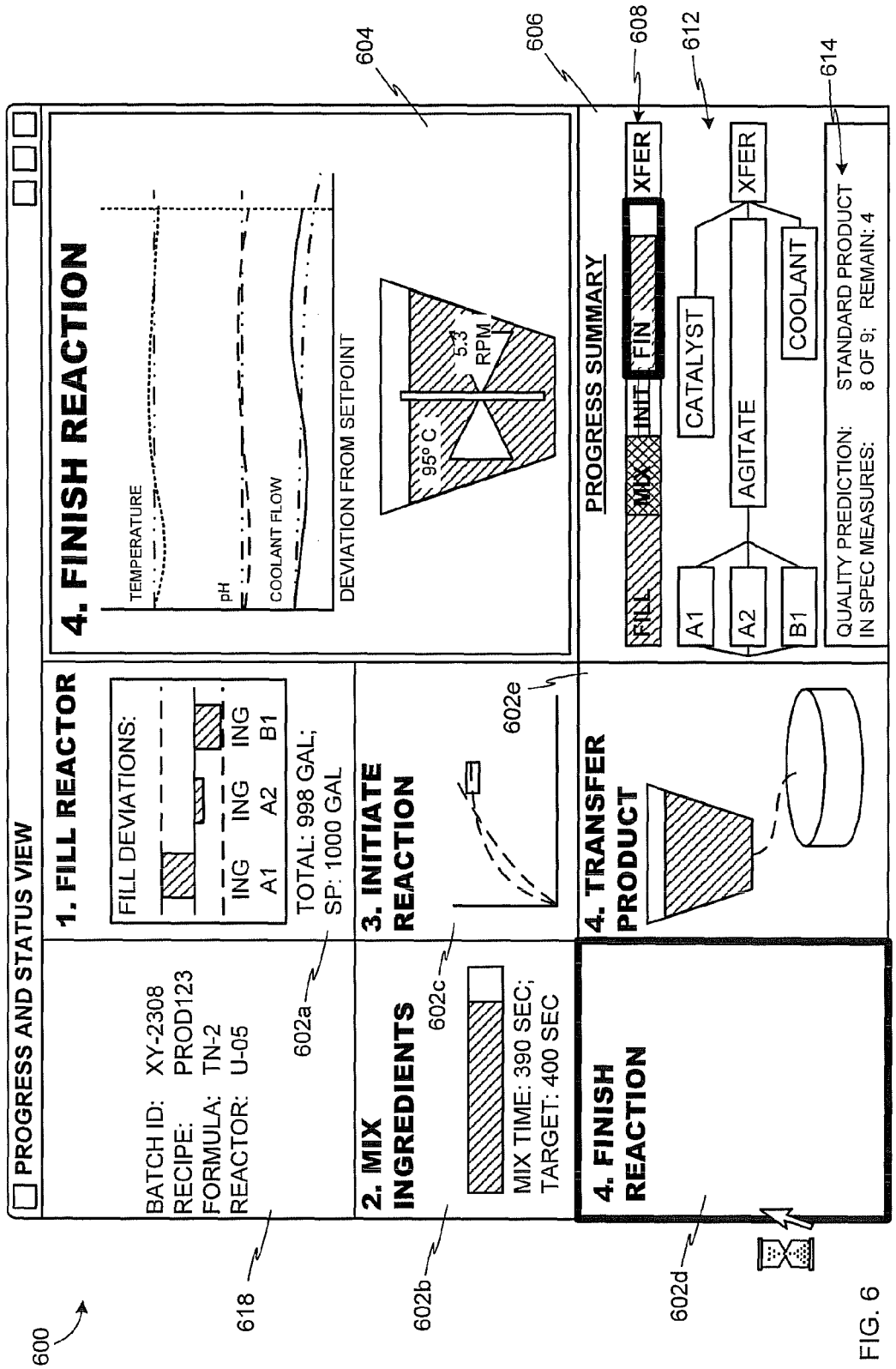

FIGS. 4-6 illustrate example GUI screens that may be implemented to represent the process flow, progress, and status information of example recipes using the example methods, apparatus, and systems described herein. The GUI screens of FIGS. 4-6 can be generated by the recipe process graphics system 302 of FIG. 3 using graphical objects stored in the recipe progress graphics repository 304 and information collected and/or processed by the batch information monitor-processor 306. The example GUI screens of FIGS. 4-6 may be displayed on any processor system (e.g., the application station 102, the operator station 104, the workstation 118 of FIG. 1 or any other type of user station) by using API's or other services provided by the recipe progress server 310 of the recipe process graphics system 302. Although the example methods, apparatus, and systems are described herein with reference to the example screens of FIGS. 4-6, such screens are only some example screens that may be implemented. The example methods, apparatus, and systems described herein can be used to implement other example progress and/or status screens in accordance with the teachings provided herein. Some screens may be similar to the example screens of FIGS. 4-6, while others may be differ by varying degrees.

Turning to FIG. 4, an example progress and status screen 400 includes a plurality of bounded display areas in an arrangement that facilitates a user's intuitive recognition of an overall process flow of an executing recipe and detailed information pertaining to the individual process phases or stages of the recipe that have been executed, are currently being executed, or have yet to be executed. In particular, the bounded display areas include a batch recipe progress display area 402, a process stage progress display area 403, a messaging/prompting display area 424, a batch control display area 426, a general information display area 434, and a process graphic area 436. In the illustrated example, the bounded display areas 402, 403, 424, 426, 434, and 436 are abutted or adjacent to one another to fit in the screen 400 simultaneously so that a user need not navigate between different screens to view overall recipe information and detailed process stage information. For example, the bounded display areas 402, 403, 424, 426, 434, and 436 can be arranged as shown in FIG. 4 or in a similar arrangement to advantageously facilitate displaying information (e.g., graphical elements, text, etc.) indicative of an entire batch recipe process flow to avoid requiring a user to access different user interface screens to view different parts of the batch recipe. Although the bounded display areas 402, 403, 424, 426, 434, and 436 are shown as having displayed border lines, in other example implementations, the displayed border lines may be omitted.

In the illustrated example, an overall batch recipe progress indicator 401 is shown in the batch recipe progress display area 402, and an overall recipe process flow is shown in the process stage progress display area 403 as indicated by stage descriptors 404a-c. Each of the stage descriptors 404a-c indicates the sequential numerations of each process stage (e.g., process stages representative of one or more of the process phases 206a-i of FIG. 2). The progressions of the process stages are indicated by respective stage progress indicators 406a-c. As shown in connection with the stage progress indicator 406a, a progress bar 407 is displayed to indicate the progress of a corresponding process stage. When the process stage corresponding to the stage progress indicator 406a starts, the progress bar 407 can be used to show the partial progress of the process stage by filling only a portion of the stage progress indicator 406a. When the process stage is complete, the progress bar 407 fills the stage progress indicator 406a in its entirety. The absence of a progress bar (e.g., the progress bar 407) in one of the stage progress indicators 406a-c indicates that the corresponding process stage has not been started. When a user observes that one or more of the stage progress indicators 406a-c are completely filled by progress bars (e.g., the progress bar 407), the user can relatively easily recognize that the corresponding process stages have already been executed and are completed, while one of the stage progress indicators 406a-c being only partially filled will indicate that the corresponding process stage is still being executed and, thus, has not yet completed.

Figure 10:
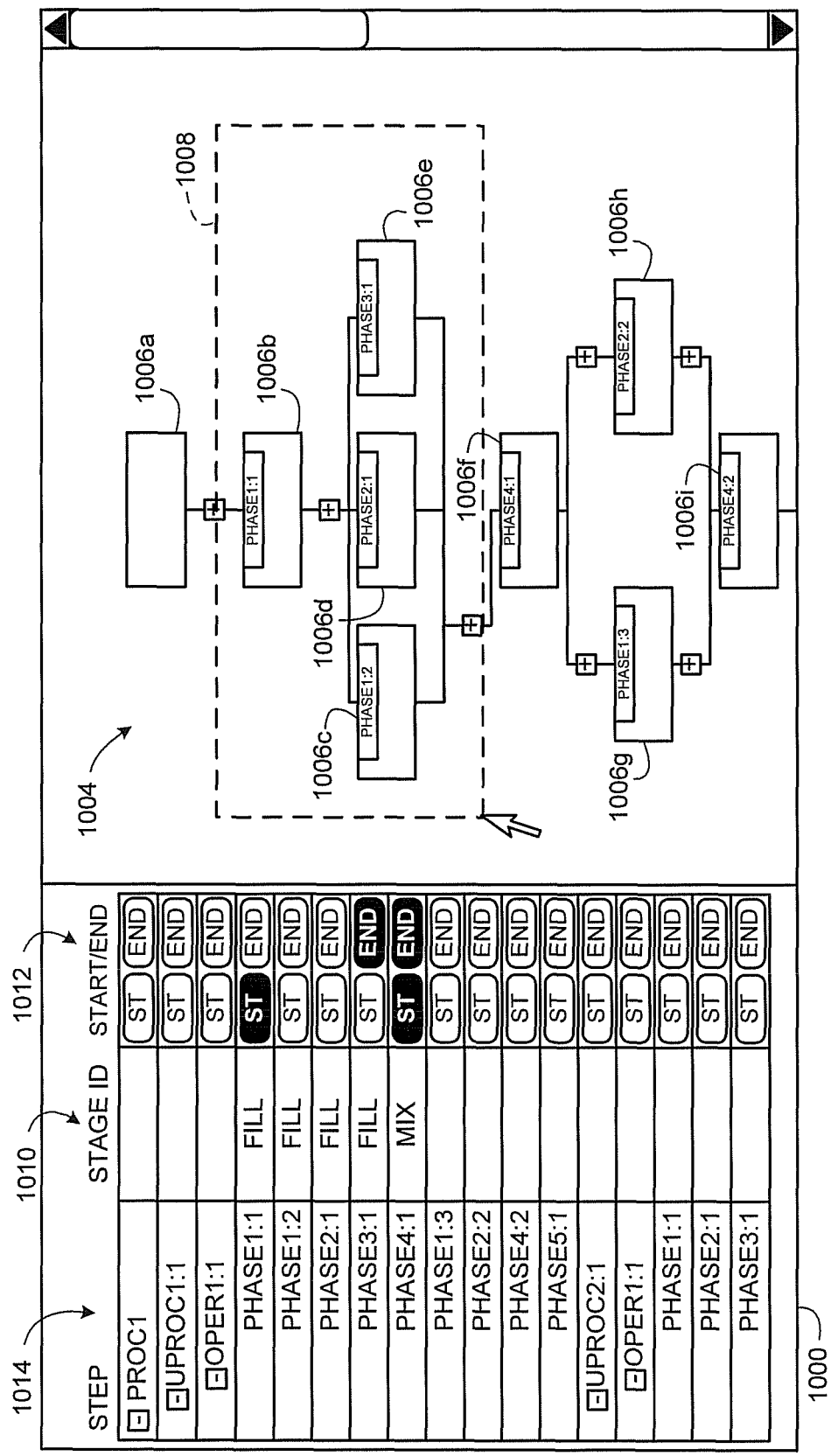
FIG. 10 is another example procedural function chart (PFC) view interface that shows a batch recipe having a plurality of process phases.

During a configuration phase of the example progress and status screen 400, a user may select which process phases (e.g., the process phases 1006a-i of FIG. 10) correspond to each of the process stages represented by respective ones of the stage progress indicators 406a-c. Referring to FIG. 10, a user may select one or more of the process phases 1006a-i to form a process stage. For example, in the illustrated example, a user selects the process phases 1006b-e to form the process stage 1008. The process stage 1008 is labeled as a 'FILL' stage in a stage ID column 1010. In some example implementations, a stage ID (e.g., 'FILL') may be stored in association with each process phase (e.g., each of the process phases 1006a-i) so that subsequent loadings of recipes will have previously configured process stages so that users need not configure stages each time a recipe is used and/or each time a different progress user interface template (e.g., a template from the templates database 336) is used in connection with a recipe. To enable a user to specify which of the process phases 1006b-e is the starting process phase of the process stage 1008 and which of the process phases 1006b-e is the ending process phase of the process stage 1008, the PFC view interface 1000 is provided with a start/end demarcation column 1012. In the illustrated example, a user has specified the process phase 1006b as the starting phase of the process stage 1008 and the process phase 1006e as the ending phase of the process stage 1008. In some instances in which a process stage includes only one process phase, that process phase is designated as the starting process phase and the ending process phase of the process stage.

Identifying starting and ending process phases of each process stage facilitates configuring the stage progress indicators 406a-c to update progress fill bars (e.g., the progress fill bar 407) at a rate or in a manner that accurately or substantially accurately represents the progress of the process phases forming the process stages represented by the stage progress indicators 406a-c. For example, when a starting process phase (e.g., the process phase 1006b) begins, a corresponding one of the stage progress indicators 406a-c will begin to fill with a progress bar (e.g., the progress bar 407), and when an ending process phase (e.g., the process phase 1006e) finishes, the corresponding one of the stage progress indicators 406a-c will be completely filed with the progress bar. Phase detection mechanisms to detect when one of the process phases 1006a-i finishes and to control transitions to a subsequent one of the process phases 1006a-i can be provided using phase transition logic such as, for example, transition logic defined by the S-88 ANSI/ISA-S88.01-1995 Batch Standard. In FIG. 4, the phase transition logic can also be used in connection with transitioning control of progress bar fill operations between the stage progress indicators 406a-c. For example, when an ending process phase (e.g., the process phase 1006e of FIG. 10) of the process stage indicator 406a finishes, transition logic of that process phase can be used to detect the transition of control to a subsequent process phase (e.g., the process phase 1006f of FIG. 10) so that the stage progress indicator 406b can begin filling with a progress bar.

Although the illustrated example of FIG. 10 shows how a user can specify individual ones of the process phases 1006a-i to form different process stages using a rectangular drag UI tool (e.g., a user-resizeable box simultaneously capturing or selecting one or more of the process phases 1006a-i), other UI techniques can also be implemented to enable a user to specify process phases that form different process stages. For example, in FIG. 10, a user may select a plurality of the process phases 1006a-i (e.g., using a user-resizable box UI tool, a select all tool, etc.) and subsequently deselect ones of those phases 1006*a-i* that are to be excluded from a particular process stage. Alternatively or additionally, a user may define a process stage by selecting different ones of the process phases 1006*a-i* using a recipe navigation hierarchy tree 1014. In some example implementations, a user may define which process phases are to form a process stage by using the recipe navigation hierarchy tree 1014 to select an entire operation 1016 (e.g., an S-88 operation) and/or an entire unit procedure 1018 (e.g., an S-88 unit procedure), each having a plurality of process phases (e.g., the process phases 1006*a-i* and/or other process phases) associated therewith. In addition, a process stage may be configured to include process phases from different operations 1016 and/or different unit procedures 1018.

Returning to FIG. 4, for each of the process stages (indicated by the stage descriptors 404*a-c*), the progress and status screen 400 presents timing information 408 and 410, completion information 412, and critical parameters 414. The timing information includes an estimated time to completion value 408 and an actual elapsed time value 410. In the illustrated example, the completion information 412 is shown as a percentage value. For each process stage, the critical parameters 414 may include any values for any parameters that are key to that process stage or critically pertinent or important to the execution of that process stage such that an operator or engineer (e.g., a user) would very likely want to be able to view it with relative ease and/or relatively quickly and/or in connection with other process status and/or progress information. For example, pressure and temperature parameters may be especially pertinent to process stages used to heat fluids, fluid level parameters may be especially pertinent to process stages used to fill tanks, pH acidity parameters may be especially pertinent to process stages used to mix ingredients, etc.

In the illustrated example, the progress and status screen 400 also includes selectable view navigation user interface controls (e.g., buttons) 416, which include a process graphic button (PG), a history view button (HV), and an alarms button (A). Each of the navigation buttons (PG), (HV), and (A) can be used to show different types of information in the display area populated by the stage progress indicators 406*a-c* or in a separate screen such as, for example, a pop-up screen. In the illustrated example, for the first process stage indicated by the process indicator 404*a*, the process graphic button (PG) may be selected to show the stage progress indicator 406*a* or a more detailed version thereof. The history view button (HV) may be selected to show a graphic (e.g., a line graph, a bar graph or some other comparative display) comparing the progress of the current execution of the process stage relative to progresses previous executions of the process stage. The alarms button (A) may be selected to show alarms that are set for different parameters (e.g., a temperature parameter, a pressure parameter, a fill level parameter, etc.) associated with the process stage.

In addition to facilitating a user's intuitive recognition of a particular process stage based on the stage descriptors 404*a*, the stage progress indicator 406*a*, and the critical parameters 414, to further facilitate a user's intuitive recognition of the particular stage being represented, a graphical icon 418 can be displayed in association with the stage descriptors 404*a*, the stage progress indicator 406*a*, and/or the critical parameters 414. The graphical icon 418 can be representative of an operation being performed in that process stage or of equipment (e.g., mixers, pumps, tanks, etc.) being used in that process stage. In the illustrated example, the graphical icon 418 is relatively small relative to other graphical elements displayed on the screen 400 so that it serves to facilitate a person's recall of the subject to which the other displayed information is related. In this manner, the graphical icon 418 does not draw attention away from other information that may be more important or pertinent to the executing recipe. In addition, by making the graphical icon 418 relatively small, more screen space or display area can be used for displaying other more useful information (e.g., the stage descriptors 404*a-c*, the stage progress indicators 406*a-c*, the critical parameters 414, and other information pertinent to the overall executing recipe).

In some instances, the graphical icon 418 may be implemented using symbols, characters, or indicia that would be recognized by users as being indicative of particular operations or equipment. In this manner, the graphical elements used to implement the graphical icon 418 need not be aesthetically similar to represented process equipment or operations. Thus, the graphical icon 418 can be made to require less space and/or to detract less from other more important information.

In the illustrated example, the progress and status screen 400 also includes the messaging/prompting display area 424, which may be used to display messages and receive user input associated with recipe executions. In addition, the progress and status screen 400 includes the batch control display area 426. In the illustrated example, the batch control display area 426 is used to display batch recipe control command icons 428 and recipe analyses tools 430. The batch recipe control command icons 428 may be selected by operators and/or engineers (e.g. users) to control the execution of recipes. In the illustrated example, the recipe analyses tools icons 430 includes a flow diagram tool (F), a historical compare tool (HC), a view journal tool (VJ), a view parameters tool (VP), and a check specs tool (CS). The flow diagram tool (F) may be used to display another screen or a pop-up screen showing a procedural function chart (e.g., the PFC view interface 200 of FIG. 2) of the recipe represented in the example progress and status screen 400. The historical compare tool (HC) may be used to display a comparison of current and historical status or progress information corresponding to current and prior executions of a recipe. The view journal tool (VJ) may be used to display information provided in journal entries by other operators, engineers, and/or automated journal entry processes. The view parameters tool (VP) may be used to display parameter values for each or for selected process stages represented in the progress and status screen 400. The check specs tool (CS) may be used to display expected values for parameters associated with a currently executing batch recipe. For example, the check specs tool (CS) may be used to show parameter values for a perfect or 'golden' batch.

In the illustrated example, the example progress and status screen 400 also includes the general information display area 434 to display batch recipe identifiers, recipe names, batch types, batch recipe descriptions, current stage descriptions, and/or any other information, which may be selected by a user. In the process graphic area 436, the example progress and status screen 400 may display a graphic, which may be representative of a currently executing batch recipe, an overall status and/or progress of a currently executing batch recipe, an overall status and/or progress of a currently executing process stage, etc. Additionally, the graphic displayed in the process graphic area 436 may be dynamically updated in real-time to show real-time status and/or progress information.

Turning to FIG. 5, another example progress and status screen 500 is configured to show progress bar graphs 502*a-f* representative of overall process flows of different batch recipes (e.g., the batch recipe 204 of FIG. 2 and other batch recipes) while simultaneously showing the progress and status of each process stage (e.g., process stages including one or more of the process phases 206a-i of FIG. 2) of those recipes and critical parameters for each currently executing process stage. The progress bar graphs 502a-f are similar in structure and format, but each represents a different recipe. In the illustrative example, the progress bar graphs 502a-f are arranged in a spatially proximate, adjacent, or abutting arrangement as shown in FIG. 5 to enable showing overall recipe information and information specific to currently executing process stages of each recipe for a plurality of recipes simultaneously. The example arrangement of the graphical elements shown in FIG. 5 facilitates a user's intuitive recognition of the different recipes and the progress and status of each recipe without requiring the user to navigate between different screens corresponding to the different recipes.

In the illustrated example, to display descriptive information about the recipes corresponding to the progress bar graphs 502a-f, each of the progress bar graphs 502a-f is displayed in association with recipe description information areas 504a-f, which can include batch recipe identifiers, product names, formula names, names of process control systems or process control system areas used to execute the recipes, etc. To save display area space for progress and status information, the example progress and status screen 500 is implemented without displaying graphical elements that are aesthetically similar to operations or process equipment. Instead, process stages of recipes are represented using bars and text so that a user can relatively easily and intuitively perceive the overall progressions and status of the recipes and detailed information for each currently executed process stage that is selectively chosen based on relative importance or relative level of pertinence to each stage. Using bars to represent process stages also enables using the template layout of the example progress and status screen 500 for different types of recipes and process stages without having to change the bar-type graphical elements to represent different types of process stages or different recipes, which may produce different products.

The progress bar graph 502a includes process stage progress indicators 506a-e arranged in a linear, serial manner to show a process flow of a corresponding recipe in which following execution of the first process stage 506a, the second process stage 506b is executed followed by execution of the third process stage 506c, the fourth process stage 506d, and the fifth process stage 506e. In the illustrated example, each of the process stage indicators 506a-e is labeled to indicate a corresponding type of process. For example, the indicator 506a is labeled 'FILL' to indicate that it is an ingredient filling process, the indicator 506b is labeled 'MIX' to indicate that it is a mixing or agitation process, the indicator 506c is labeled 'HEAT' to indicate that it is a heating process, the indicator 506d is labeled 'COOL' to indicate that it is a cooling process, and the indicator 506e is labeled 'XFER' to indicate that it is a product transfer process. As discussed above in connection with FIG. 10, each process stage represented by a respective one of the process stage progress indicators 506a-e can be configured to include one or more process phases (e.g., one or more of the process phases 1006a-i). In addition, the progress bar graphs 502a-f and the process stage progress indicators 506a-e can be configured as described above in connection with FIG. 10 to, for example, designate starting and ending process phases and enable transitioning progress bar fill operations between different ones of the process stage progress indicators 506a-e.

The size or length of each of the process stage progress indicators 506a-e can be determined based on the contribution of a respective process stage to execution of the overall recipe. That is, each process stage progress indicator 506a-e can be assigned a weight or a weighting value corresponding to the contribution of its respective process stage to the overall recipe so that displaying the process stage progress indicator 506a-e as a certain length or size facilitates a user's intuitive recognition of the amount of time required by a process stage or an amount of work performed by a process stage relative to the overall recipe. Historical duration data and/or expected duration data can be used to assign weights to each of the process stage progress indicators 506a-e. The historian data may be ideal (e.g., 'golden' batch) data or average data. In some instances, such as ingredient fill or product transfer stages, the weight assigned to a corresponding process stage indicator (e.g., the process stage progress indicator 506a or 506e) can be based on the fill level (of, e.g., a tank) or the amount of product to be transferred such that the fill level or the amount of product has a one-to-one relationship with the weight to the corresponding process stage indicator.

As shown in equation 1 below, a progress of a recipe ($P_R$) can be expressed using weighting values ($w_{Si}$).

$$P_R = \Sigma w_{Si} P_{Si} \quad \text{Equation 1}$$

In equation 1 above, the weighting value ($w_{Si}$) is a predetermined normalizing process stage weight value and ($P_{Si}$) is a process stage progress value where i is the index value of a particular process stage. Thus, the recipe progress ($P_R$) is the sum of the products of its process stage progress values ($P_{Si}$) and weighting values ($w_{Si}$).

The value of a process stage progress ($P_S$) can be expressed as shown in Equation 2 below.

$$P_S = \Sigma w_{Oi} P_{Oi} + \Sigma w_{Qj} P_{Qj} + \Sigma w_{Vk} P_{Vk} \quad \text{Equation 2}$$

In equation 2 above, (O) refers to an S-88 operation (e.g., an operation defined in the S-88 ANSI/ISA-S88.01-1995 Batch Standard), (Q) refers to an S-88 equipment phase (e.g., one of the process phases 206a-i of FIG. 2) that is not subordinate to any included S-88 operations (O), and (V) refers to an arbitrary process variable corresponding to a measured status or measured progress of an operation or equipment phase. In some example implementations, in any one process stage, only one of the summation terms in equation 2 may be needed, and may have only one element in the summation.

If the first summation term of equation 2 above is used, the progress of each included operation (O) can be expressed as shown in equation 3 below.

$$P_O = \Sigma w_{Qi} P_{Qi} \quad \text{Equation 3}$$

In equation 3 above, (Qi) refers to the S-88 equipment phases subordinate to the S-88 operation (O).

The S-88 equipment phase progress ($P_Q$) can be expressed as shown below in equation 4.

$$P_Q = \Sigma w_{Vi} P_{Vi} \quad \text{Equation 4}$$

In equation 4 above, ($P_{Vi}$) refers to the progress of the individual process variables ($V_i$) directly affected by the equipment phase logic of a corresponding S-88 equipment phase (P). The individual variable progress can be expressed as shown below in equation 5.

$$P_Q = |V_c - V_0| / |V_E - V_0| \quad \text{Equation 5}$$

In equation 5 above, ($V_0$) is the initial value, ($V_c$) is a current value, and ($V_E$) is an expected value of an individual variable ($V_i$). Here, if an individual process variable progress value ($P_V$) becomes greater than one (i.e., >1), the individual process variable progress value ($P_V$) is clamped at one (i.e., 100%). Similarly, if an operation or equipment phase has completed, the value of each operation progress ($P_O$) or equipment phase progress ($P_O$) respectively is defined as one (i.e., 100%), whether or not the current value(s) ($V_c$) or the process variable(s) reached the expected value(s) ($V_E$). Similar clamping logic can also be provided for the individual variable progress ($P_V$) in equation 2 above, where it is independent of equipment phase and/or operation logic.

In some example implementations, many processes have non-linearities or variables that do not increase monotonically. In such instances, a progress indicator (e.g., one of the progress indicators 506a-e of FIG. 5) with a simple weight will not proceed in a linear fashion as may be desired. While equation 5 above may be sufficient in most cases to define how fill rates of a progress indicator (e.g., the progress indicators 506a-e) should be displayed, other cases may require a weighting function to produce an acceptably monotonically increasing progress value ($P_V$). An example of such a weighting function is shown below in equation 6.

$$P_V = f_w(V_c, V_O, V_E) \qquad \text{Equation 6}$$

In equation 6 above, a function ($f_w$) produces a monotonically increasing result approaching a value of one as the current value ($V_c$) approaches the expected value ($V_E$).

In other example implementations, weighting values may be determined based on importance data or criticality data provided in recipe data to indicate which process stages are relatively more important or relatively more critical to a particular product than other process stages. The importance data or criticalness data for a recipe may alternatively or additionally be determined by comparing ingredient names, formulae names, or process stage names in the recipe data to rules stored in a rules database that stores or cross-references relative importance levels with ingredient names, formulae names, or process stage names.

Each of the process stage progress indicators 506a-e can be dynamically updated in, for example, real-time or substantially real-time, to show a current progress and/or status of its corresponding process stage execution. In the illustrated example, to show progress (e.g., duration, elapsed time, time to completion, etc.), the process stage progress indicator 506c is configured to be incrementally filled with a progress bar 508. When execution of the process stage corresponding to the indicator 506c is complete, the indicator 506c will be completely filled with the bar 508. The amount of fill provided by the progress bar 508 can be based on progress data that is derived using any of a number of sources. For example, progress data may be based on a number of steps (e.g., step indices) or operations to be performed for a particular process stage, a current execution time and an expected duration, a current fill level and an expected fill level, or any other type of data.

In the illustrated example, the process stage progress indicators 506a-e are concatenated to form an overall recipe progress bar. By filling each of the process stage progress indicators 506a-e as shown in the illustrated example with progress bars, a user can relatively easily determine the progress of a particular process stage and the overall progress of an overall recipe. That is, ones of the process stage progress indicators 506a-e corresponding to already executed and completed process stages are completely filled and one of the process stage progress indicators 506a-e for a currently executing process stage is partially filled so that the completely filled process stage indicators and the partially filled process stage indicator collaboratively, collectively, or cooperatively indicate the overall progress of the corresponding recipe being executed. Progress bars (e.g., the bar 508) used to fill the process stage progress indicators 506a-e can be filled with different colors and/or patterns. In some instances the colors and/or patterns may be used to convey status information (e.g., notifications, alerts, alarms, times to completion, etc.).

In the illustrated example, the example progress and status screen 500 also includes a detailed status display area 510 located proximate the progress bar graphs 502a-f to show detailed status information corresponding to currently executing process stages (e.g., process stages indicated by the process stage progress indicators 506a-e). The detailed status display area 510 can be used to show values for parameters (e.g., critical parameters) that are particularly pertinent (e.g., relatively important) to currently executing process stages. For example, the currently executing process stage corresponding to the process stage progress indicator 506c involves heating a mixture, and temperature is a parameter that is particularly pertinent to the heating process. Thus, a measured temperature value 512 is displayed in association with the progress bar graph 502a to indicate the temperature of the mixture being heated at the process stage corresponding to the process stage progress indicator 506c.

To facilitate recognition by users (e.g., operators, engineers, etc.) of displayed parameter types (e.g., critical parameters), icons or graphic symbols representative of respective parameter types can advantageously be displayed in association with parameter values in the detailed status display area 510. For example, the temperature value 512 is displayed in association with a thermometer graphic. For an RPM parameter, the RPM parameter value may be displayed in association with a rotating disc graphic. Other types of graphics may also be used for other parameter types.

The detailed status display area 510 can also be used to show progression indicators to indicate the general directions of progressions for each displayed parameter value (e.g., the temperature value 512). A progression indicator 514 is shown in association with the temperature value 512 using an upward pointing arrowhead to indicate an increasing temperature. To indicate a decreasing temperature, the progression indicator 514 could alternatively be displayed using a downward pointing arrowhead. To determine what the progression indicator 514 should indicate, the batch information monitor-processor 306 of FIG. 3 can be provided with a function that determines a trend of a predetermined number of previously measured temperature values to identify an upward trend or a downward trend. For flat trends (i.e., neither upward nor downward trends exist), a flat line graphic 516 or other neutral graphic can be displayed to indicate a flat state.

To provide users with product quality information related to products being produced by recipes corresponding to the progress bar graphs 502a-f, quality values can be shown in the detailed status display area 510. The quality values can be determined by the batch information monitor-processor 306 or by some other entity in the enterprise 100 of FIG. 1 and retrieved for display by the batch information monitor-processor 306. In the illustrated example, a quality value 518 of a product being produced by the recipe corresponding to the progress bar graph 502a indicates a quality of 95. In some instances, other status information (e.g., rotations per minute (RPM) held at a particular rate) may be displayed instead of quality information.

Turning to FIG. 6, another example progress and status screen 600 includes bounded display areas to show process stage thumbnail or capsule summaries 602a-e, detailed information display area 604 to show detailed progress and/or status information corresponding to a selected one of the process stage capsule summaries 602a-e, and an overall recipe progress display area 606 to display information indicative of the overall progress and/or status of a batch recipe. In the illustrated example, each of the process stage capsule summaries 602a-e displays a brief summary overview of the progress and/or status of its respective process stage (e.g., a process stage including one or more of the process phases 206a-i of FIG. 2). The information displayed via each of the process stage capsule summaries 602a-e may be selected to be parameter data that is particularly important or that a user considers to be particularly important for the process stage corresponding to that capsule summary 602a-e. The summary information in the process stage capsule summaries 602a-e, the detailed information in the detailed information display area 604, and the overall recipe progress/status information in the overall recipe progress display area 606 can be generated and/or collected by the batch information monitor-processor 306 of FIG. 3.

In the illustrated example, each of the process stage capsule summaries 602a-e is numbered and arranged in a sequential manner to represent the process flow of a corresponding batch recipe. In addition, the bounded display areas in which the process stage capsule summaries 602a-e are displayed are arranged in a grid-like or tabular arrangement. Although the bounded display areas for the summaries 602a-e are shown as having displayed border lines, in other example implementations, the displayed border lines may be omitted.

To indicate the progress of the batch recipe, the overall recipe progress display area 606 includes a recipe progress bar graph 608, which may be substantially similar to the progress bar graphs 502a-f of FIG. 5 to indicate the overall progress of the corresponding recipe. The progress bar graph 608 includes process stage indicators similar to the process stage progress indicators 506a-e of FIG. 5 to indicate the progress of each process stage. As discussed above in connection with FIG. 10, each process stage represented by a respective one of the process stage progress indicators of the progress bar graph 608 and each of the process stage capsule summaries 602a-e can be configured to include one or more process phases (e.g., one or more of the process phases 1006a-i). In addition, the progress bar graph 608 and the process stage capsule summaries 602a-e can be configured as described above in connection with FIG. 10 to, for example, designate starting and ending process phases and enable transitioning progress summary and fill operations between different ones of the process stage capsule summaries 602a-e and process stage progress indicators of the progress bar graph 608.

To show detailed information for a particular process stage, a user clicks on one of the process stage capsule summaries 602a-e to display the detailed information in the detailed information display area 604. Visual indicators such as a bolded border around a selected one of the process stage capsule summaries 602a-e (and/or a corresponding one of the process stage indicators of the progress bar graph 608) may be used to indicate to a user that detailed information is available for that process stage in the detailed information display area 604. Additionally or alternatively, the display of summary information in a selected one of the process stage capsule summaries 602a-e may be withheld from display while detailed information for that process stage is being displayed in the detailed information display area 604.

In the illustrated example, the overall recipe progress display area 606 is configured to display an operations flow chart 612 for the batch recipe represented by the progress bar graph 608. Specifically, the operations flow chart 612 indicates that ingredients (A1), (A2), and (B1) are filled during a fill stage and are agitated during a mix stage, a reaction initiation stage, and a reaction finishing stage. The operations flow chart 612 also indicates that a catalyst is added to the product during the reaction initiation and finishing stages, and a coolant is added during the reaction finishing stage. Also displayed in the overall recipe progress display area 606 is a quality indicator 614 representative of the overall quality of a product being produced. In the illustrated example, the example progress and status screen 600 also includes a general recipe information display area 618 to display batch recipe identifiers, recipe names, batch types, batch recipe descriptions, current stage descriptions, and/or any other information, which may be selected by a user.

Figure 7:
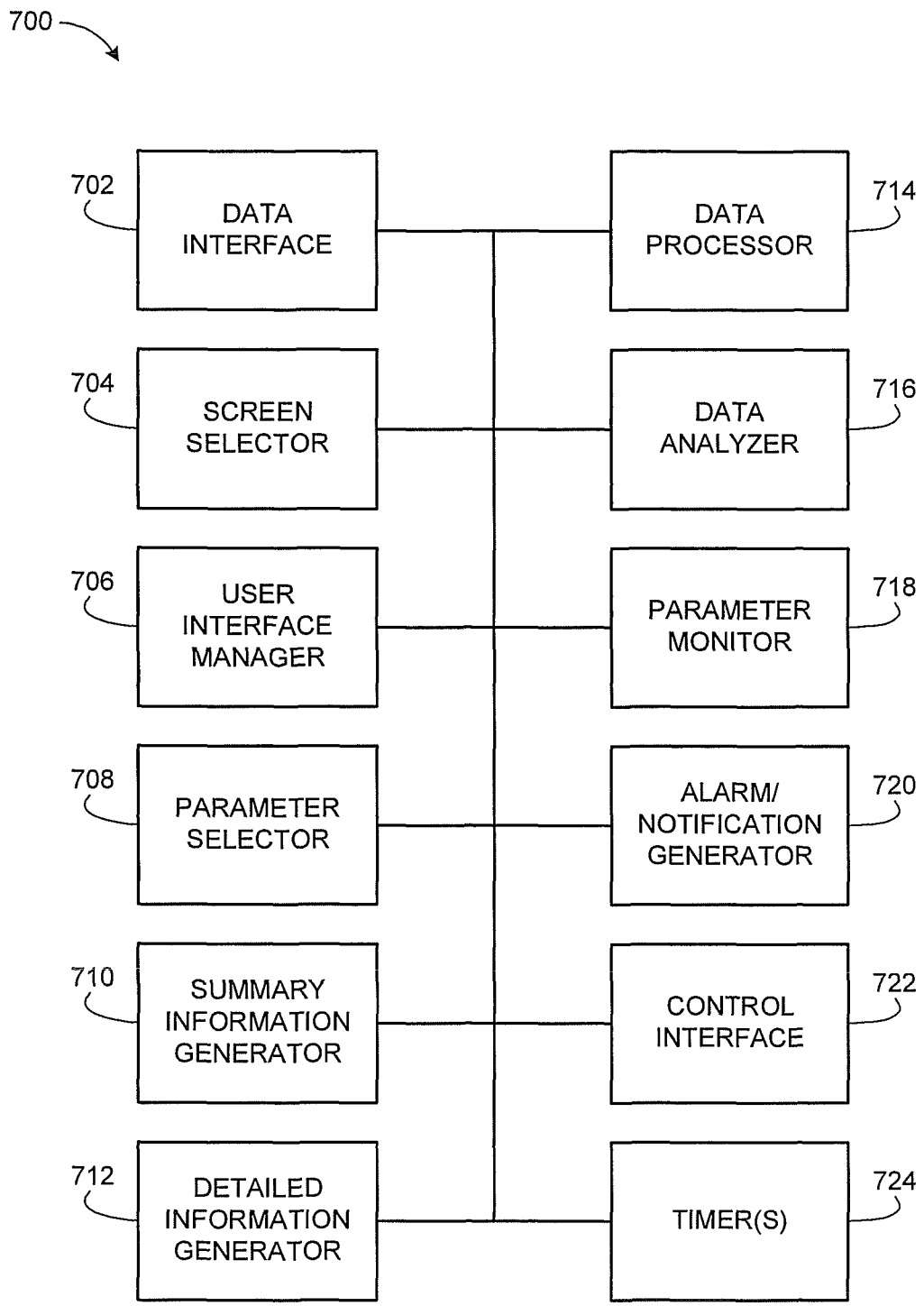
FIG. 7 is a block diagram of an example apparatus that may be used to generate and/or display progress and/or status screens.

FIG. 7 is a block diagram of an example apparatus 700 that may be used to generate and/or display progress and/or status screens (e.g., the example progress and status screens 400, 500, and 600 of FIGS. 4-6). In some example implementations, the example apparatus 700 may be used to implement the batch information monitor-processor 306 of FIG. 3. The example apparatus 700 may be implemented using any desired combination of hardware, firmware, and/or software. For example, one or more integrated circuits, discrete semiconductor components, or passive electronic components may be used. Additionally or alternatively, some or all of the blocks of the example apparatus 700, or parts thereof, may be implemented using instructions, code, and/or other software and/or firmware, etc. stored on a machine accessible medium that, when executed by, for example, a processor system (e.g., the processor system 910 of FIG. 9) perform the operations represented in the flow diagram of FIGS. 8A and 8B. Although the example apparatus 700 is described as having one of each block described below, the example apparatus 700 may be provided with two or more of any block described below. In addition, some blocks may be disabled, omitted, and/or combined with other blocks.

To receive, retrieve, and/or communicate data, the example apparatus 700 is provided with a data interface 702. The data interface 702 may be used to store and retrieve data to and from a local cache memory in or communicatively coupled to the batch information monitor-processor 306. The data interface 702 may also be used to retrieve graphical elements from the recipe progress graphics repository 304 (FIG. 3), recipe progress history data from the recipe progress history database 308 (FIG. 3), the batch history data 312 from the batch historian 314 (FIG. 3), the phase data 316 from the batch unit phase interfaces 318 (FIG. 3), the process data 320 from the process equipment 322 (FIG. 3), the timer data 324, and the template data 338 from the templates database 336 (FIG. 3). In addition, the data interface 702 can be used to retrieve the recipe transitions, formula values, stored data, and journal data 326 from the batch procedure 328, batch unit procedures 330, and batch operations 332 of FIG. 3.

The data interface 702 can also be configured to receive requests for screen displays from the recipe progress server 310 and communicate screen displays or data for the screen displays to the recipe progress server 310. For instance, when a user selects one of the process stage capsule summaries 602a-e of FIG. 6, the data interface 702 can collect and/or generate data to show detailed information about the process stage corresponding to the selected one of the summaries 602a-e and communicate the detailed information to the recipe progress server 310 for display in the detailed information display area 604 of FIG. 6.

To select screens to display recipe progress/status information, the example apparatus 700 is provided with a screen selector 704. The screen selector 704 may select screens (e.g., one of the example progress and status screens 400, 500, and 600 of FIGS. 4-6) based on requests received from the recipe progress server 310. For example, if a user logs on to the operator station 104 and requests to view the progress/status of a particular recipe, the operator station 104 can use an API to communicate a request to the recipe progress server 310 to receive a progress and status screen corresponding to the identity of the user or a progress and status screen selected by the user. In turn, the screen selector 704 can select the requested progress and status screen from, for example, the recipe progress graphics repository 304, the templates database 336, or any other storage area.

To generate the user interface information for the progress and status screens, the example apparatus 700 is provided with a user interface manager 706. For example, after the screen selector 704 retrieves a template for a particular progress and status screen, the user interface manager 706 is used to identify the areas or portions of the retrieved progress and status screen requiring progress and/or status information. The user interface manager 706 then collects the required information from other portions of the example apparatus 700 or from other entities in the example enterprise 100 (FIG. 1) and ensures that the information is associated with corresponding portions of the progress and status screen for display. The user interface manager 706 can also be configured to continuously update information in each progress and status screen in real-time or substantially real-time by ensuring that required data is collected from entities of enterprise 100 (FIG. 1) and update the progress and status information of the progress and status screens based on the collected information.

To select parameters to display via progress and status screens, the example apparatus 700 includes a parameter selector 708. The parameter selector 708 may be configured to select parameters that are to be displayed based on requested progress and/or status information. For example, the parameter selector 708 may be configured to determine parameters that are particularly important or particularly pertinent for display in association with a process stage progress indicator (e.g., one of the process stage progress indicators 506a-e of FIG. 5). In the illustrated example of FIG. 5, when the process stage corresponding to the process stage progress indicator 506c is being executed, the parameter selector 708 may determine that a temperature parameter is particularly important for a user because the process stage involves a heating operation. As such, the parameter selector 708 may communicate a message to the data interface 702 to retrieve a measured temperature value of the product being heated so that the measured temperature can be displayed as the temperature value 512 (FIG. 5). In some instances, parameters to be displayed are selected or pre-selected or are pre-programmed into screen templates. In such instances, the parameter selector 708 can identify the specified parameters and request the data interface 702 to retrieve corresponding values.

To generate summary information to show progress and/or status summaries of particular process stages (e.g., process stages including one or more of the process phases 206a-i of FIG. 2) or overall batch recipes (e.g., the batch recipe 204 of FIG. 2), the example apparatus 700 is provided with a summary information generator 710. The summary information generator 710 may work in cooperation with other resources of the example apparatus 700 to generate progress and/or status information and generate summaries of the progress/status information generated by those resources. For example, the summary information generator 710 may generate the summaries displayed via the process stage capsule summaries 602a-e of FIG. 6 by collecting detailed information from other resources of the example apparatus, summarizing the detailed information (e.g., selectively extracting information) and arranging the summary information as, for example, specified by a screen template selected by the screen selector 704.

To generate detailed information to show detailed progress and/or status information of particular process stages (e.g., process stages including one or more of the process phases 206a-i of FIG. 2) or overall batch recipes (e.g., the batch recipe 204 of FIG. 2), the example apparatus 700 is provided with a detailed information generator 712. The detailed information generator 712 may work in cooperation with other resources of the example apparatus 700 to generate detailed progress and/or status information. For example, the detailed information generator 712 may be used to generate the detailed information displayed in the detailed information display area 604 by gathering the detailed information from other resources of the example apparatus and arranging the detailed information as, for example, specified by a screen template selected by the screen selector 704.

To process data (e.g., parameter measurement values, historical data, etc.), the example apparatus 700 is provided with a data processor 714. The data processor 714 may be provided with different functions or algorithms to process data using mathematical operations, statistical operations, logic operations, etc. to generate progress and/or status information specified by the user interface manager 706, the parameter selector 710, the summary information generator 710, and/or the detailed information generator 712.

To analyze data, the example apparatus 700 is provided with a data analyzer 716. For example, the data analyzer 716 may be configured to analyze process control data (e.g., measured values) received from entities in the process control system 110, data generated by the data processor 714, historical data, etc. to, for example, identify patterns, identify trends, evaluate performance, evaluate product quality, etc. In the illustrated example of FIG. 4, the data analyzer 716 may be used to determine the estimated time to completion value 408 by analyzing the progress and/or status of a corresponding process stage and/or batch recipe. In the illustrated example of FIG. 5, the data analyzer 716 may be used to generate the quality value 518 displayed in the progress and status screen 500. Also in the illustrated example of FIG. 5, the data analyzer 716 may be used to determine progression trends of parameter values to generate progression indicators (e.g., the progression indicator 514). In the illustrated example of FIG. 6, the data analyzer 716 may be used to analyze measured temperature, pH levels, and coolant flow parameter values to determine deviation curves shown in the detailed information display area 604.

To monitor parameter values, the example apparatus 700 is provided with a parameter monitor 718. The parameter monitor 718 may be configured to monitor parameter values to determine, for example, whether they have reached critical or other predetermined values (e.g., whether they have exceeded or fallen below specified threshold values). The parameter values to monitor may be specified by the user interface manager 706 based on, for example, progress/status screens selected by the screen selector 704 or recipe information defining a recipe (e.g., the batch recipe 204 of FIG. 2).

To generate alarms, alerts, or notifications, the example apparatus 700 is provided with an alarm/notification generator 720. The alarm/notification generator 720 may be configured to receive messages or other communications from the parameter monitor 718 indicative of parameters that have reached, for example, critical values or other predefined values. The alarm/notification generator 720 may then generate alarms, alerts, or notifications to notify users. Alarm, alerts or notifications may be indicated in various ways. For example, color fills or pattern fills of progress bars (e.g., the progress bars 407 of FIG. 4 and 508 of FIG. 5) may be used to indicate particular notifications (e.g., warning levels, attention to certain parameter types, etc.). Also, alarms, alerts or notifications may be displayed in messaging display areas such as, for example, the messaging/prompting display area 424 of FIG. 4. In addition, alarms, alerts or notifications may be generated by blinking the display of corresponding parameter values such as, for example, the quality value 518 when it reaches an unacceptable value or a value close to being of unacceptable quality.

To control aspects or portions of a process control system (e.g., the process control system 110 of FIG. 1), the example apparatus 700 is provided with a control interface 722. In connection with the illustrated example of FIG. 4, the control interface 722 may communicate control messages to processor systems or devices of the process control system 110 in response to a user selecting ones of the batch recipe control command icons 428.

To set timers to collect process control data in real-time or substantially real-time and updated progress/status screens, the example apparatus 700 is provided with one or more timer(s) 724. The timer(s) 724 may be implemented using a real-time clock (RTC) and time setpoint registers, counters, count-down timers, etc. The timer(s) 724 may be set by, for example, the user interface manager 706 for different parameters and other data to determine when to retrieve updated data from the sources of those parameters and other data.

Figure 8A:
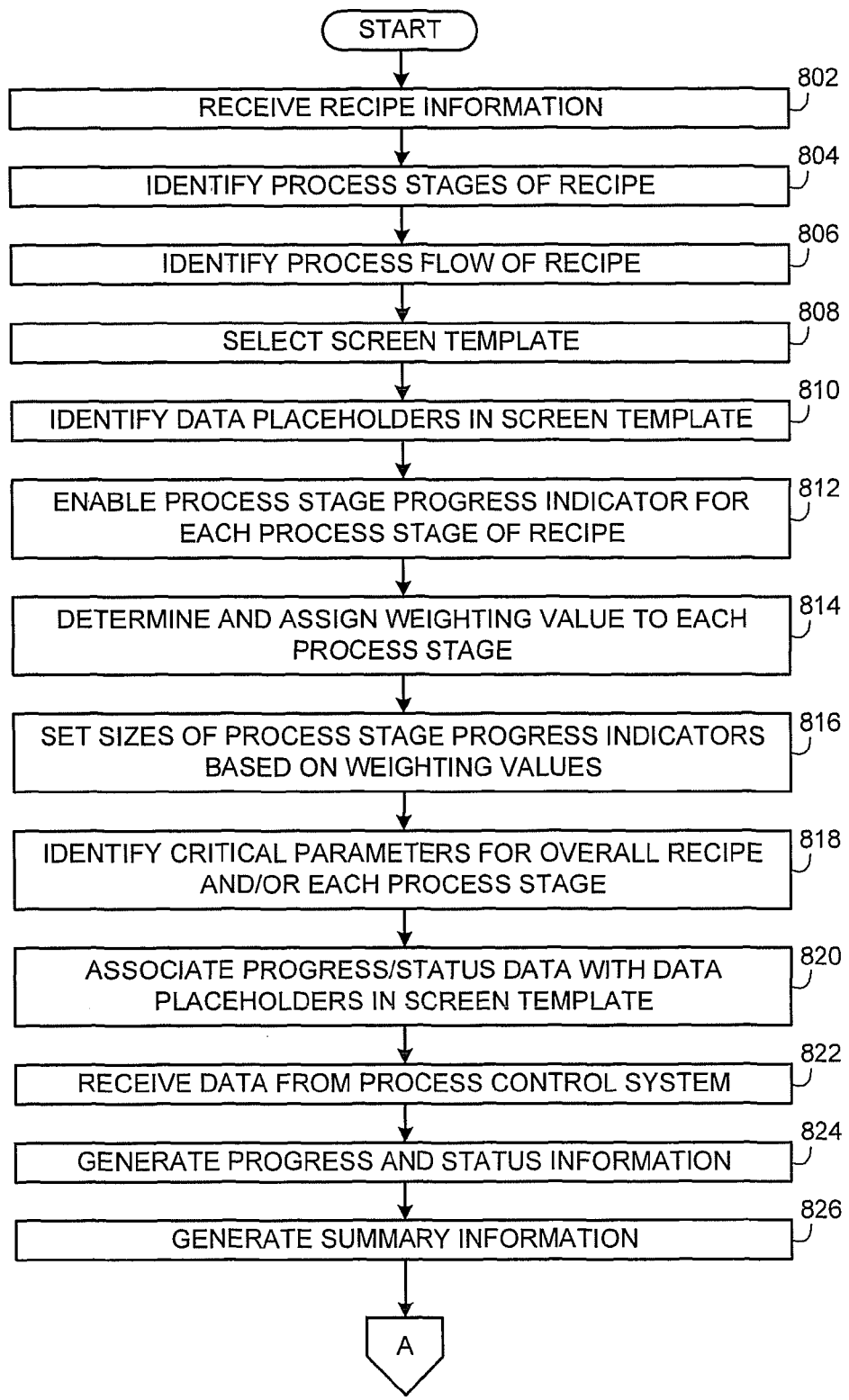
FIGS. 8A and 8B depict a flow diagram of example methods that may be used to implement the example recipe process graphics system of FIG. 3 and/or the example apparatus of FIG. 7 to display progress and/or status information of recipes being executed in a process control system.
Figure 8B:
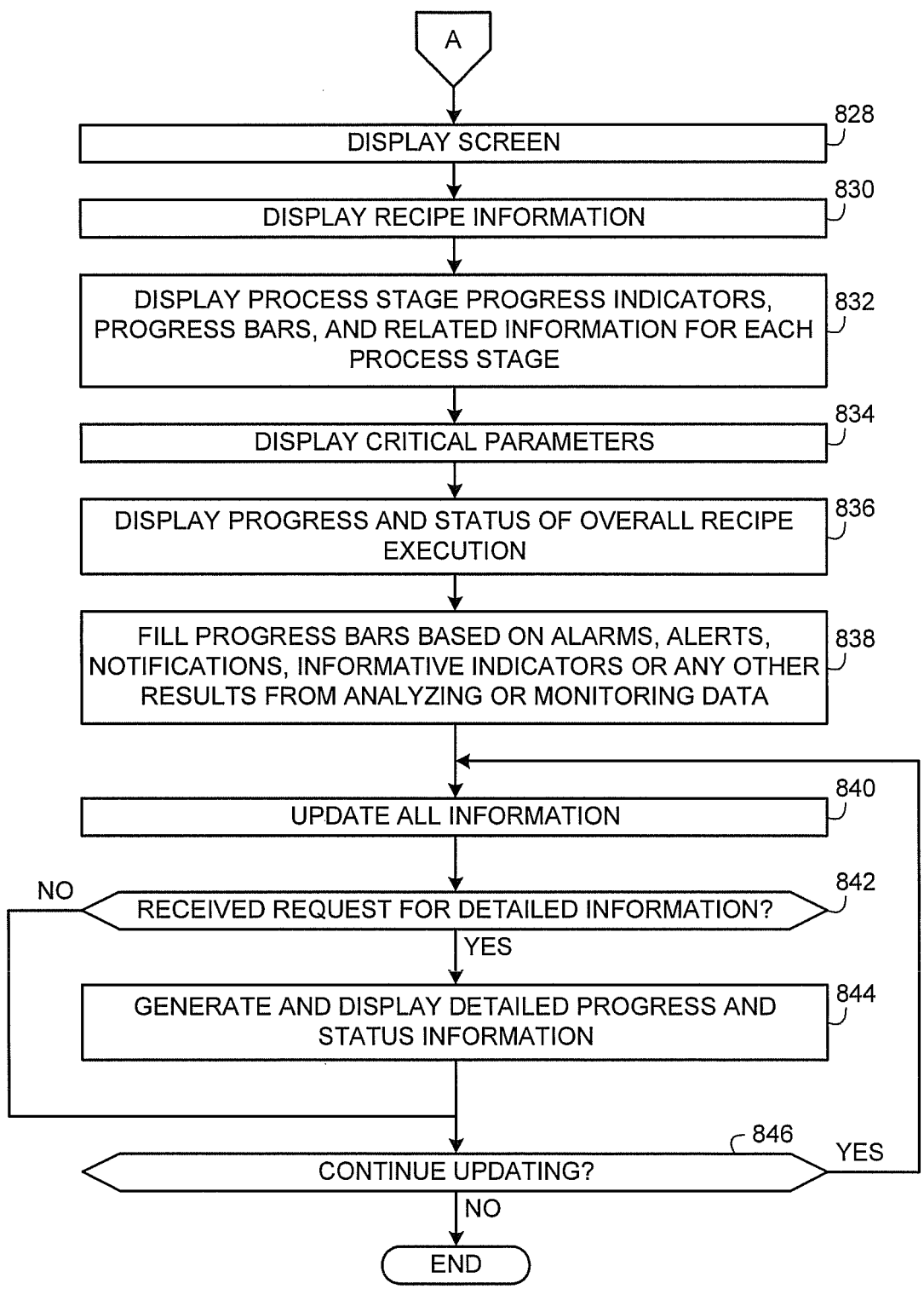

FIGS. 8A and 8B depict a flow diagram of example methods that may be used to implement the example recipe process graphics system 302 of FIG. 3 and/or the example apparatus 700 of FIG. 7 to display progress and/or status information of recipes being executed in a process control system. In some example implementations, the example method of FIGS. 8A and 8B may be implemented using machine readable instructions comprising a program for execution by a processor (e.g., the processor 912 shown in the example processor system 910 of FIG. 9). The program may be embodied in software stored on a tangible medium such as a CD-ROM, a floppy disk, a hard drive, a digital versatile disk (DVD), or a memory associated with the processor 912 and/or embodied in firmware and/or dedicated hardware in a well-known manner. Further, although the example program is described with reference to the flow diagram illustrated in FIGS. 8A and 8B, persons of ordinary skill in the art will readily appreciate that many other methods of implementing the example recipe process graphics system 302 and the example apparatus 700 may alternatively be used. For example, the order of execution of the blocks may be changed, and/or some of the blocks described may be changed, eliminated, or combined.

Turning to FIG. 8A, initially, the data interface 702 (FIG. 7) receives a batch recipe (block 802). For example, the data interface 702 may receive the batch recipe (e.g., the batch recipe 204 of FIG. 2) from the recipe progress server 310 after the recipe progress server 310 receives an API call including the recipe from an application. In some example implementations, the data interface 702 may receive a batch recipe identifier from the recipe progress server 310 so that the example apparatus 700 can retrieve the batch recipe from a storage location based on the batch recipe identifier. The user interface manager 706 then identifies the process stages of the received recipe (block 804) and a process flow of the recipe (block 806). For example, the user interface manager 706 may identify process stages as described above in connection with FIG. 10.

The screen selector 704 (FIG. 7) selects a screen template (block 808). For example, the screen selector 704 may select a screen template stored in the recipe progress graphics repository 304 or in the templates database 336 of FIG. 3 based on, for example, user input specifying one of the screen templates or a default setting that associates one of the templates with the recipe received at block 802. Other criteria may alternatively or additionally be used to select a screen template. In the illustrative examples of FIGS. 4-6, the selected screen template may be a template corresponding to one of the progress and status screens 400, 500, and 600.

The user interface manager 706 identifies data placeholders in the screen template (block 810). Data placeholders are used to associate or link graphical elements, display text, display values, or other display indicia (e.g., the stage progress indicators 406*a-c*, the timing information 408 and 410, the critical parameters 414, the messaging/prompting display area 424 of FIG. 4; the process stage progress indicators 506*a-e*, the progress bar 508, the temperature value 512, the progression indicator 514, the quality value 518 of FIG. 5; the process stage capsule summaries 602*a-e*, the progress bar graph 608, the operations flow chart 612, the quality indicator 614 of FIG. 6; etc.) to be displayed on a progress and status screen with recipe progress and/or status information generated based on data retrieved from a process control system. When the example apparatus 700 generates new or updated progress and/or status information, the newly generated or updated information can be displayed on a corresponding progress and status screen based on the data links or data associations with the data placeholders.

The user interface manager 706 enables a process stage progress indicator for each process stage of the recipe (block 812). For example, a process stage progress indicator may be enabled for the process stage 1008 of FIG. 10 so that the process stage progress indicator is representative of the process phases 1006*b-e* of FIG. 10. In the illustrative example of FIG. 4, the user interface manager 706 may enable each of the process stage progress indicators 406*a-c*. In the illustrative example of FIG. 5, the user interface manager 706 may enable each of the process stage progress indicators 506*a-e*. In the illustrative example of FIG. 6, the user interface manager 706 may enable each of the process stage progress indicators used to form the recipe progress bar graph 608.

The data processor 714 (FIG. 7) determines and assigns weighting values to each process stage of the recipe (block 814). For example, the data processor 714 may determine time-based or importance-based weighting values to determine the size (or length) and/or the fill-rate of process stage progress indicators (e.g., the process stage progress indicators 406*a-c* of FIG. 4 or 506*a-e* of FIG. 5). In some example implementations, the data processor 714 may determine weighting values based on historical data corresponding to previously executed instances of respective process stages (and/or ideal 'golden' batch data or expected performance data) to determine execution duration. The process stages in a recipe can then be weighted against one another based on their respective durations to determine their sizes or lengths for display. In this manner, a user can relatively easily and quickly assess the relative execution duration of each process stage in a recipe based on the size of each of the process stage indicators.

In other example implementations, the data processor 714 may determine weighting values based on importance data or criticalness data provided in recipe data to indicate which process stages are relatively more important or relatively more critical to a particular product than other process stages. The data processor 714 may additionally or alternatively determine importance data or criticalness data for a recipe by comparing ingredient names, formulae names, or process stage names in the recipe data to rules stored in a rules database that stores or cross-references relative importance levels with ingredient names, formulae names, or process stage names.

The user interface manager 706 sets the sizes of the process stage progress indicators enabled at block 812 based on the weighting values determined and assigned at block 814 (block 816). For example, in the illustrated example of FIG. 5, the user interface manager 716 may set the sizes or lengths of each of the process stage progress indicators 506a-e.

The parameter selector 708 (FIG. 7) identifies critical parameters for the overall recipe and/or each process stage of the recipe (block 818). In the illustrated example of FIG. 4, the parameter selector 708 may identify the critical parameters 414. In the illustrated example of FIG. 5, the parameter selector 708 may identify the temperature value 512 and/or the quality value 518.

The user interface manager 706 associates progress/status data with data placeholders in screen template (block 820). In the illustrated example of FIG. 4, the user interface manager 706 may associate critical parameter data identified at block 818 with critical parameter place holders corresponding to the critical parameters 414. The user interface manager 706 may also associate process stage progress data with each of the process stage indicators 406a-c. In the illustrated example of FIG. 5, the user interface manager 706 may associate process stage progress data with each of the process stage progress indicators 506a-e, critical parameter data with data placeholders for the temperature value 512 and the quality value 518, and progression data with the progression indicator 514.

The data interface 702 receives data from the process control system (block 822) associated with execution of the recipe received at block 802. For example, the data interface 702 may receive time (duration) data, parameter measurement data (e.g., pressure data, temperature data, flow data, pH level data, fill level data, etc.) from different field devices and/or controllers in the process control system 110 of FIG. 1.

The data processor 714 and the data analyzer 716 (FIG. 7) generate progress and status information (block 824). For example, the data processor 714 may generate the progress and status information based on the data received at block 822. In some example implementations, the data processor 714 may also use historical data and/or ideal or 'golden' batch data to generate the progress and status information.

The summary information generator 710 (FIG. 7) generates summary information (block 826) based on the progress and status information generated at block 824. In the illustrated example of FIG. 6, the summary information generator 710 may generate the summary information in each of the process stage capsule summaries 602a-e.

The user interface manager 706 causes the screen to be displayed (block 828) (FIG. 8B). For example, the user interface manager 706 can communicate the screen selected at block 808 and a message to the recipe progress server 310 (FIG. 3) to display the screen, and the recipe progress server 310 can forward a response to a requesting application indicating that the screen is available at a particular memory reference for display.

The user interface manager 706 causes recipe information to be displayed (block 830). In the illustrated example of FIG. 4, the user interface manager 706 may cause the recipe information (e.g., batch recipe identifiers, recipe names, batch types, batch recipe descriptions, current stage descriptions, etc.) to be displayed in the general information display area 434 by communicating the recipe information to the recipe progress server 310. In the illustrated example of FIG. 5, the user interface manager 706 may cause the recipe information to be displayed in the recipe description information areas 504a-f. In the illustrated example of FIG. 6, the user interface manager 706 may cause the recipe information to be displayed in the general recipe information display area 618.

The user interface manager 706 causes process stage progress indicators, progress bars, and related information for each process stage of the recipe to be displayed (block 832). In the illustrated example of FIG. 4, the user interface manager 706 can notify the recipe progress server 310 to cause the process stage indicators 406a-c, corresponding progress bars, and the completion information 412 to be displayed. In the illustrated example of FIG. 4, the user interface manager 706 can cause the process stage progress indicators 506a-e, the progress bar 508, and process stage name labels to be displayed. In the illustrated example of FIG. 6, the user interface manager 706 can cause the process stage indicators, progress bars, and names corresponding to the recipe progress bar graph 608 to be displayed.

The user interface manager 706 causes critical parameter values to be displayed (block 834). For example, the user interface manager 706 can notify the recipe progress server 310 to cause the display of the critical parameters 414 of FIG. 4, the temperature value 512 of FIG. 5, the quality value 518 of FIG. 5, etc.

The user interface manager 706 causes progress and status information of the overall recipe to be displayed (block 836). For example, the user interface manager 706 may notify the recipe progress server 310 to cause the display of overall recipe progress/status information (e.g., start time/date, overall batch progress, duration, quality, recipe flow, etc.) of the batch recipe progress section 402 of FIG. 4 and the overall recipe progress display area 606.

The alarm/notification generator 720 causes progress bars to be filled based on alarms, alerts, notifications, informative indicators or any other results from analyzing or monitoring data (block 838). For example, the alarm/notification generator 720 may receive messages from the parameter monitor 718 indicative of parameters that have reached, for example, critical values or other predefined values and may select pattern fills or color fills corresponding to those events. The pattern fills or color fills can then be displayed in, for example, corresponding ones of the progress bars for the overall batch recipe progress indicator 401 and the stage progress indicators 406a-c of FIG. 4, the progress bars of the process stage progress indicators 506a-e of FIG. 5, the progress bars of the recipe progress bar graph 608 of FIG. 6.

The user interface manager 706 causes all displayed information to be updated (block 840). For example, the user interface manager 706 can communicate update instructions, messages, or requests to other portions of the example apparatus 700 to provide updated progress and/or status information (e.g., real-time or substantially real-time progress and/or status information). The user interface manager 706 can update the information at periodic and/or aperiodic intervals based on one or more of the timers 724 (FIG. 7).

The user interface manager 706 determines whether it has received a request for detailed information (e.g., the detailed information displayed in the detailed information area 606 of FIG. 6) (block 842). For example, the user interface manager 706 may receive a request for detailed information when a screen being displayed provides a user the capability to select detailed information views and when a user selects to view the detailed information (e.g., by selecting one of the process stage capsule summaries 602a-e of FIG. 6). Otherwise, if a particular progress and status screen being displayed does not provide the capability to retrieve more detailed information or if a user has not selected to view more detailed information, the user interface manager 706 will not receive a request for detailed information.

If the user interface manager 706 receives a request for detailed information at block 844, the detailed information generator 712 (FIG. 7) generates the requested detailed information (block 844). After the detailed information generator 712 generates the detailed information or if the user interface manager 706 does not receive a request for detailed information, the user interface manager 706 determines whether it should continue to update the displayed progress and/or status information (block 846). For example, the user interface manager 706 may be configured to continuously (periodically or aperiodically) update progress and/or status information on displayed screens (e.g., based on one or more of the timers 724 of FIG. 7) as long as those screens are being actively displayed. However, the user interface manager 706 may be configured to not perform update routines for progress and status screens that have been closed (e.g., by a user). If the user interface manager 706 determines that it should continue to update progress and/or status information (block 846), control returns to block 842. Otherwise, the example method of FIGS. 8A and 8B is ended.

Figure 9:
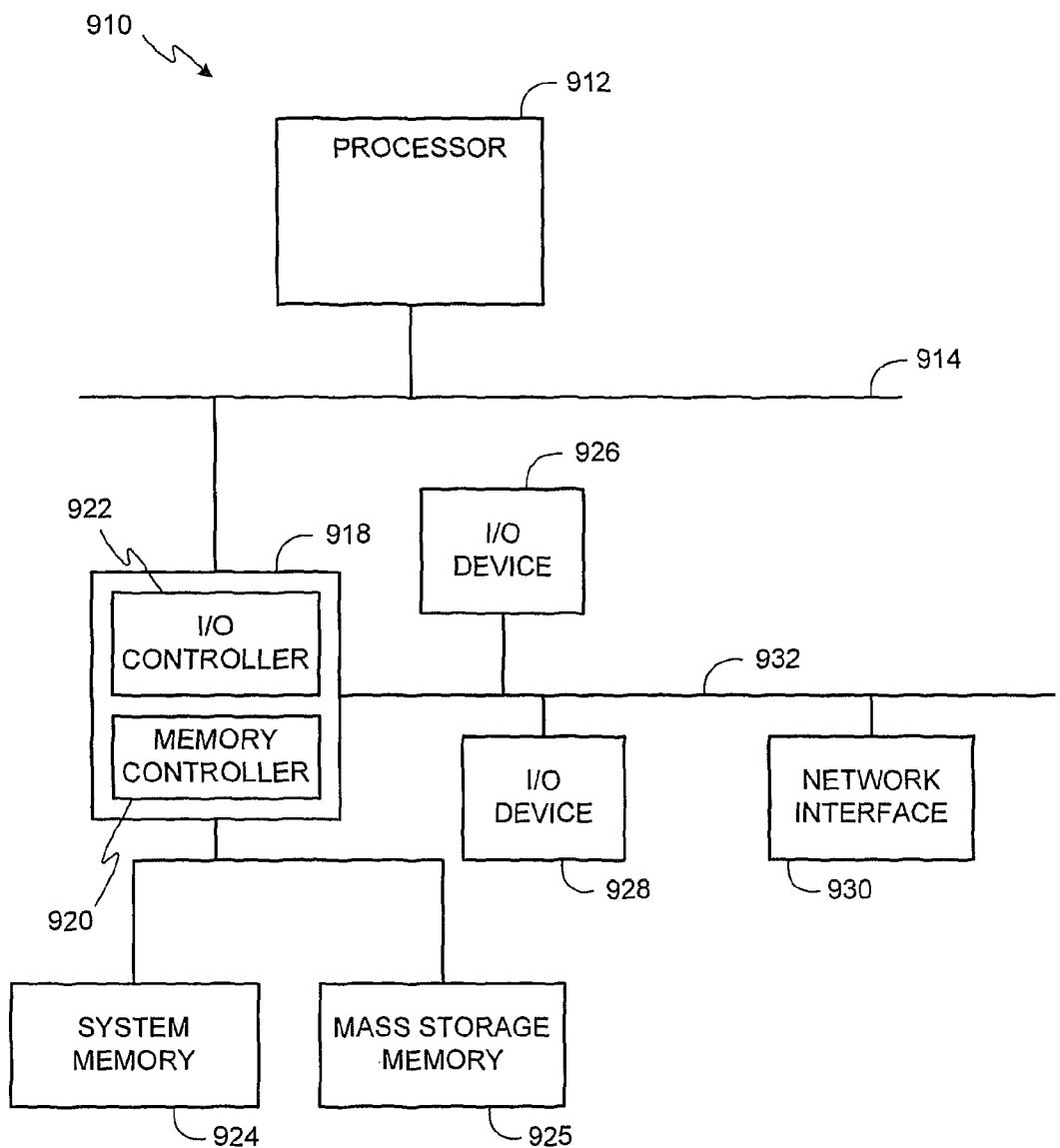
FIG. 9 is a block diagram of an example processor system that may be used to implement the methods and apparatus described herein.

FIG. 9 is a block diagram of an example processor system 910 that may be used to implement the apparatus and methods described herein. As shown in FIG. 9, the processor system 910 includes a processor 912 that is coupled to an interconnection bus 914. The processor 912 may be any suitable processor, processing unit or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and a peripheral input/output (I/O) controller 922. As is well known, a chipset typically provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 925.

The system memory 924 may include any desired type of volatile and/or non-volatile memory such as, for example, static random access memory (SRAM), dynamic random access memory (DRAM), flash memory, read-only memory (ROM), etc. The mass storage memory 925 may include any desired type of mass storage device including hard disk drives, optical drives, tape storage devices, etc.

The peripheral I/O controller 922 performs functions that enable the processor 912 to communicate with peripheral input/output (I/O) devices 926 and 928 and a network interface 930 via a peripheral I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode (ATM) device, an 802.11 device, a DSL modem, a cable modem, a cellular modem, etc. that enables the processor system 910 to communicate with another processor system.

While the memory controller 920 and the I/O controller 922 are depicted in FIG. 9 as separate functional blocks within the chipset 918, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of displaying recipe information for a process control system, the method comprising:

displaying a user interface screen associated with a recipe being executed in a process control system, wherein the recipe includes a plurality of process phases;

displaying a plurality of process stage progress indicators in the user interface screen in an arrangement representative of the process flow of the recipe, wherein each of the process stage progress indicators is representative of at least one of the process phases of the recipe, at least one of the process stage progress indicators having a filled portion and a non-filled portion, the filled portion indicative of a completed amount of a corresponding one of the process phases, and the non-filled portion indicative of a portion to be completed of the corresponding one of the process phases;

updating a first one of the process stage progress indicators in substantially real-time based on information received from the process control system; and displaying a second one of the process stage progress indicators linearly concatenated in seriatim with the first process stage progress indicator to form a recipe progress bar, wherein a first amount of fill of the first process stage progress indicator in concatenation with a second amount of fill of the second process stage progress indicator simultaneously represents an overall progress of the recipe and progresses of ones of the process phases corresponding to the first and second process stage progress indicators.

2. A method as defined in claim 1, further comprising:

selecting a parameter from a plurality of parameters associated with the process phase corresponding to the first process stage progress indicator, wherein the parameter is selected based on relative importance for observation by a user relative to others of the plurality of parameters; and displaying the parameter in association with the first process stage progress indicator.

3. A method as defined in claim 1, further comprising filling at least a portion of the first process stage progress indicator using at least one of a pattern fill or a color fill to represent at least one of an alarm or a notification.

4. A method as defined in claim 1, further comprising displaying a second plurality of process stage progress indicators in the user interface screen in an arrangement representative of a process flow of a second recipe while simultaneously displaying the plurality of process stage progress indicators representative of the process flow of the recipe.

5. A method as defined in claim 1, further comprising displaying detailed information corresponding to at least one of the process phases in a detailed information display area.

6. An apparatus to display recipe information for a process control system, the apparatus including one or more of a circuit, a hardware processor, or a hardware memory, and further comprising:

a screen selector to select a user interface screen to display in association with a recipe being executed in a process control system, wherein the recipe includes a plurality of process phases;

a user interface manager to:
  display a plurality of process stage progress indicators in the user interface screen in an arrangement representative of the process flow of the recipe, wherein each of the process stage progress indicators is representative of at least one of the process phases of the recipe, at least one of the process stage progress indicators having a filled portion and a non-filled portion, the filled portion indicative of a completed amount of a corresponding one of the process phases, and the non-filled portion indicative of a portion to be completed of the corresponding one of the process phases, and
  display a second one of the process stage progress indicators linearly concatenated in seriatim with the first process stage progress indicator to form a recipe progress bar, wherein a first amount of fill of the first process stage progress indicator in concatenation with a second amount of fill of the second process stage progress indicator simultaneously represents an overall progress of the recipe and progresses of ones of the process phases corresponding to the first and second process stage progress indicators; and
a data processor to generate updated progress information for a first one of the process stage progress indicators in substantially real-time based on information received from the process control system.

7. An apparatus as defined in claim 6, further comprising a parameter selector to select a parameter from a plurality of parameters associated with the process phase corresponding to the first process stage progress indicator, wherein the parameter is selected based on relative importance for observation by a user relative to others of the plurality of parameters, and wherein the user interface manager is further to display the parameter in association with the first process stage progress indicator.

8. An apparatus as defined in claim 6, further comprising a notification generator to generate at least one of an alarm or a notification, wherein the user interface manager is further to cause filling of at least a portion of the first process stage progress indicator using at least one of a pattern fill or a color fill to represent at the least one of the alarm or the notification.

9. An apparatus as defined in claim 6, further comprising a detailed information generator to generate detailed information corresponding to at least one of the process phases for display in a detailed information display area.

10. A method of displaying recipe information for a process control system, the method comprising:
  displaying a screen associated with a recipe including a plurality of process phases;
  partitioning the screen into bounded display areas, wherein the bounded display areas include:
    a plurality of summary information display areas,
    a detailed information display area, and
    an overall recipe progress display area;
  generating a plurality of summary capsules, each corresponding to at least one of the process phases of the recipe;
  displaying each of the summary capsules in a respective one of the summary information display areas in an arrangement indicative of a process flow of the recipe;
  displaying a recipe progress bar in the overall recipe progress display area to display an overall progress of the recipe, the recipe progress bar comprising process stage progress bars for corresponding ones of the process phases, the process stage progress bars linearly concatenated in seriatim to simultaneously represent progresses of the process phases and an overall progress of the recipe, at least one of the process stage progress bars including a filled portion and a non-filled portion, the filled portion indicative of a completed amount of a corresponding one of the process phases, and the non-filled portion indicative of a portion to be completed of the corresponding one of the process phases; and
  in response to user-selection of one of the summary information display areas, displaying detailed information in the detailed information display area, the detailed information corresponding to one of the process phases corresponding to the selected one of the summary information display areas.

11. A method as defined in claim 10, wherein the bounded display areas are in a grid-like arrangement or a tabular arrangement.

12. An apparatus to display recipe information for a process control system, the apparatus including one or more of a circuit, a hardware processor, or a hardware memory, and further comprising:
  a screen selector to select a screen to display in association with a recipe including a plurality of process phases, wherein the screen is partitioned into bounded display areas, and wherein the bounded display areas include:
    a plurality of summary information display areas,
    a detailed information display area, and
    an overall recipe progress display area;
  a summary information generator to generate a plurality of summary capsules, each corresponding to at least one of the process phases of the recipe;
  a user interface manager to:
    display each of the summary capsules in a respective one of the summary information display areas in an arrangement indicative of a process flow of the recipe, and
    display a recipe progress bar in the overall recipe progress display area to display an overall progress of the recipe, the recipe progress bar comprising process stage progress bars for corresponding ones of the process phases, the process stage progress bars linearly concatenated in seriatim to simultaneously represent progresses of the process phases and an overall progress of the recipe, at least one of the process stage progress bars including a filled portion and a non-filled portion, the filled portion indicative of a completed amount of a corresponding one of the process phases, and the non-filled portion indicative of a portion to be completed of the corresponding one of the process phases; and
  a detailed information generator to, via a data processor, generate detailed information corresponding to at least one of the process phases of the recipe, the user interface manager to display the detailed information in the detailed information display area in response to user-selection of one of the summary information display areas, and the detailed information corresponding to at least one of the process phases corresponding to the selected one of the summary information display areas.

13. An apparatus as defined in claim 12, further comprising a parameter selector to select a parameter from a plurality of parameters corresponding to at least one of the process phases, wherein the parameter is selected based on relative importance for observation by a user relative to others of the plurality of parameters, and wherein the user interface manager is further to display the parameter in association with one of the summary capsules.

14. A method of displaying recipe information for a process control system, the method comprising:

displaying a screen associated with first and second recipes being executed in at least one process control system;

displaying a first plurality of process stage progress indicators in the screen in an arrangement representative of a first process flow of the first recipe and a second plurality of process stage progress indicators in the screen in an arrangement representative of a second process flow of the second recipe, wherein each of the first process stage progress indicators represents at least one of a first plurality of process phases of the first recipe, and wherein each of the second process stage progress indicators represents at least one of a second plurality of process phases of the second recipe;

displaying a first progress fill element in association with one of the first process stage progress indicators and a second progress fill element in association with one of the second process stage progress indicators, the first progress fill element having a filled portion and a non-filled portion, the filled portion indicative of a completed amount of at least one of the first process phases, and the non-filled portion indicative of a portion to be completed of the at least one of the first process phases, and wherein the second progress fill element indicates a progress of at least one of the second process phases of the second recipe corresponding to the one of the second process stage progress indicators; and displaying other progress fill elements in association with others of the first process stage progress indicators, wherein the first progress fill element and the other progress fill elements are linearly concatenated in seriatim in the arrangement representative of the first process flow of the first recipe to simultaneously represent the overall progress of the first recipe and progresses of corresponding ones of the first plurality of process phases.

15. A method as defined in claim 14, further comprising updating the first and second progress fill elements in substantially real-time.

16. A method as defined in claim 14, further comprising filling at least a portion of the first progress fill element using at least one of a pattern fill or a color fill to represent at least one of an alarm or a notification.

17. A method as defined in claim 14, further comprising:
selecting a parameter from a plurality of parameters associated with at least one of the first process phases, wherein the parameter is selected based on relative importance for observation by a user relative to others of the plurality of parameters; and
displaying the parameter in association with the first process stage progress indicators.

18. A method as defined in claim 14, further comprising displaying detailed information corresponding to at least one of the process phases in a detailed information display area.

19. A method as defined in claim 14, further comprising assigning weighting values to each of the first process stage progress indicators, and setting the size of each of the first process stage progress indicators based on a corresponding one of the weighting values.

* * * * *